(12) United States Patent
Kiyama et al.

(10) Patent No.: US 8,370,324 B2
(45) Date of Patent: Feb. 5, 2013

(54) DATA MANAGEMENT METHOD USING A TABLE, AND RELATED STORAGE DEVICE, STORAGE MEDIUM AND PROGRAM

(75) Inventors: Jiro Kiyama, Chiba (JP); Yuri Iwano, Chiba (JP); Takayoshi Yamaguchi, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 325 days.

(21) Appl. No.: 12/039,246

(22) Filed: Feb. 28, 2008

(65) Prior Publication Data

US 2009/0164487 A1 Jun. 25, 2009

Related U.S. Application Data

(62) Division of application No. 10/497,288, filed as application No. PCT/JP02/12398 on Nov. 27, 2002, now abandoned.

(30) Foreign Application Priority Data

Nov. 29, 2001 (JP) ................................ 2001-363587

(51) Int. Cl.
*G06F 17/30* (2006.01)
(52) U.S. Cl. ....................................... 707/711; 707/763
(58) Field of Classification Search ........................ None
See application file for complete search history.

(56) References Cited

U.S. PATENT DOCUMENTS

| 5,163,148 | A | 11/1992 | Walls |
| 5,526,480 | A | 6/1996 | Gibson |
| 5,703,997 | A | 12/1997 | Kitamura et al. |
| 5,835,671 | A | 11/1998 | Kitamura et al. |
| 5,867,462 | A | 2/1999 | Tholen et al. |
| 5,956,453 | A | 9/1999 | Yaegashi et al. |
| 5,987,506 | A | 11/1999 | Carter et al. |
| 6,047,103 | A | 4/2000 | Yamauchi et al. |
| 6,056,555 | A | 5/2000 | Tada |
| 6,148,341 | A | 11/2000 | Shimizu |
| 6,154,601 | A | 11/2000 | Yaegashi et al. |
| 6,393,421 | B1 | 5/2002 | Paglin |
| 6,549,911 | B2 | 4/2003 | Gustman |

(Continued)

FOREIGN PATENT DOCUMENTS

| CN | 1281219 | 1/2001 |
| EP | 0 801 391 | 10/1997 |

(Continued)

OTHER PUBLICATIONS

NA83045453, "Method for Dropping Data Sets," IBM Technical Bulletin, vol. 25, Apr. 1983.

(Continued)

*Primary Examiner* — Baoquoc To
(74) *Attorney, Agent, or Firm* — Edwards Wildman Palmer LLP; David G. Conlin; Steven M. Jensen

(57) ABSTRACT

The objective of the present invention is to manage reference movies using an index file, without causing the user to be perplexed. the reference movies are generated because of, for instance, the upper limit of the file size. The index file manages sets of information regarding the files being managed. Examples of these sets of information are information for determining whether or not a file is presented to the user, information for determining whether or not a file is original, and information indicating whether or not nondestructive editing has been done. Based on such information, the erasure, displaying a list, and so on are carried out. Thus, it is possible to manage the reference movies using the index file, without causing the user to be perplexed.

12 Claims, 34 Drawing Sheets

U.S. PATENT DOCUMENTS

| | | |
|---|---|---|
| 6,577,807 B1 | 6/2003 | Yaegashi et al. |
| 6,618,709 B1 | 9/2003 | Sneeringer |
| 6,785,716 B1 | 8/2004 | Nobakht |
| 6,834,349 B1 * | 12/2004 | Higurashi et al. ............ 713/193 |
| 6,871,205 B1 | 3/2005 | Yamada et al. |
| 6,943,834 B1 | 9/2005 | Hirai |
| 6,993,073 B2 | 1/2006 | Foong et al. |
| 6,993,567 B1 | 1/2006 | Yodo et al. |
| 7,027,717 B1 | 4/2006 | Tsujii et al. |
| 7,131,048 B2 | 10/2006 | Suzuki et al. |
| 7,162,144 B1 | 1/2007 | Ono et al. |
| 7,849,455 B2 | 12/2010 | Kadner et al. |
| 2001/0006495 A1 | 7/2001 | Hayashi et al. |
| 2001/0006500 A1 | 7/2001 | Nakajima et al. |
| 2001/0037465 A1 | 11/2001 | Hart et al. |
| 2002/0051059 A1 * | 5/2002 | Shimizu et al. ............... 348/153 |
| 2005/0125380 A1 | 6/2005 | Yamada et al. |
| 2005/0125381 A1 | 6/2005 | Yamada et al. |
| 2005/0163487 A1 | 7/2005 | Tsujii et al. |
| 2005/0163488 A1 | 7/2005 | Tsujii et al. |
| 2005/0165845 A1 | 7/2005 | Tsujii et al. |
| 2005/0165846 A1 | 7/2005 | Tsujii et al. |
| 2008/0154930 A1 * | 6/2008 | Blair et al. .................... 707/101 |
| 2010/0185709 A1 | 7/2010 | Kiyama et al. |
| 2010/0185710 A1 | 7/2010 | Kiyama et al. |
| 2010/0191709 A1 | 7/2010 | Kiyama et al. |

FOREIGN PATENT DOCUMENTS

| | | |
|---|---|---|
| EP | 0 980 071 | 2/2000 |
| EP | 1024495 | 8/2000 |
| EP | 1052644 | 11/2000 |
| EP | 1071088 | 1/2001 |
| EP | 1 085 515 | 3/2001 |
| EP | 1130599 A2 | 9/2001 |
| JP | 04-123171 A | 4/1992 |
| JP | 10-051733 A | 2/1998 |
| JP | 10-234007 | 9/1998 |
| JP | 10-269145 A | 10/1998 |
| JP | 11-134233 | 5/1999 |
| JP | 2000-187606 A | 7/2000 |
| JP | 2001-069458 A | 3/2001 |
| JP | 2001-084705 | 3/2001 |
| JP | 2001-101790 | 4/2001 |
| JP | 2001-189913 | 7/2001 |
| JP | 2001-250341 | 9/2001 |
| JP | 2001-346156 | 12/2001 |
| JP | 2002-373480 | 12/2002 |

OTHER PUBLICATIONS

Search Report for European Patent Application No. 10158690.7, mailed Nov. 12, 2010.
Search Report for European Patent Application No. 10158695.6, mailed Nov. 12, 2010.
Search Report for European Patent Application No. 10158701.2, mailed Nov. 12, 2010.
Office Action of U.S. Appl. No. 12/750,700, mailed Mar. 1, 2011.
Office Action of U.S. Appl. No. 12/750,703, mailed Mar. 4, 2011.
Office Action of U.S. Appl. No. 12/750,707, mailed Mar. 1, 2011.
Office Action for U.S. Appl. No. 12/750,692 mailed Apr. 27, 2011.
Office Action for U.S. Appl. No. 12/750,707 mailed Sep. 7, 2011.
Office Action for U.S. Appl. No. 12/750,700 mailed Aug. 25, 2011.
Office Action for U.S. Appl. No. 12/750,703 mailed Aug. 10, 2011.
Office Action for U.S. Appl. No. 12/750,696 mailed Jul. 27, 2011.
Office Action for U.S. Appl. No. 12/750,696 mailed Feb. 11, 2011.
Office Action for U.S. Appl. No. 12/750,692 mailed Oct. 25, 2011.
Office Action for U.S. Appl. No. 12/750,696 mailed Dec. 15, 2011.
Office Action for U.S. Appl. No. 12/750,700 mailed Dec. 6, 2011.
Office Action for U.S. Appl. No. 12/750,703 mailed Dec. 16, 2011.
Office Action for U.S. Appl. No. 12/750,707 mailed Dec. 16, 2011.
Office Action for U.S. Appl. No. 12/750,692 mailed Feb. 16, 2012.
Office Action for U.S. Appl. No. 12/750,696 mailed May 9, 2012.
Office Action for U.S. Appl. No. 12/750,700 mailed Apr. 17, 2012.
Office Action for U.S. Appl. No. 12/750,703 mailed May 9, 2012.
Office Action for U.S. Appl. No. 12/750,707 mailed May 8, 2012.
Office Action for U.S. Appl. No. 12/750,692 mailed Jul. 18, 2012.
Office Action for U.S. Appl. No. 12/750,696 mailed Nov. 20, 2012.
Office Action for U.S. Appl. No. 12/750,700 mailed Nov. 21, 2012.
Office Action for U.S. Appl. No. 12/750,703 mailed Nov. 20, 2012.
Office Action for U.S. Appl. No. 12/750,707 mailed Nov. 20, 2012.

* cited by examiner

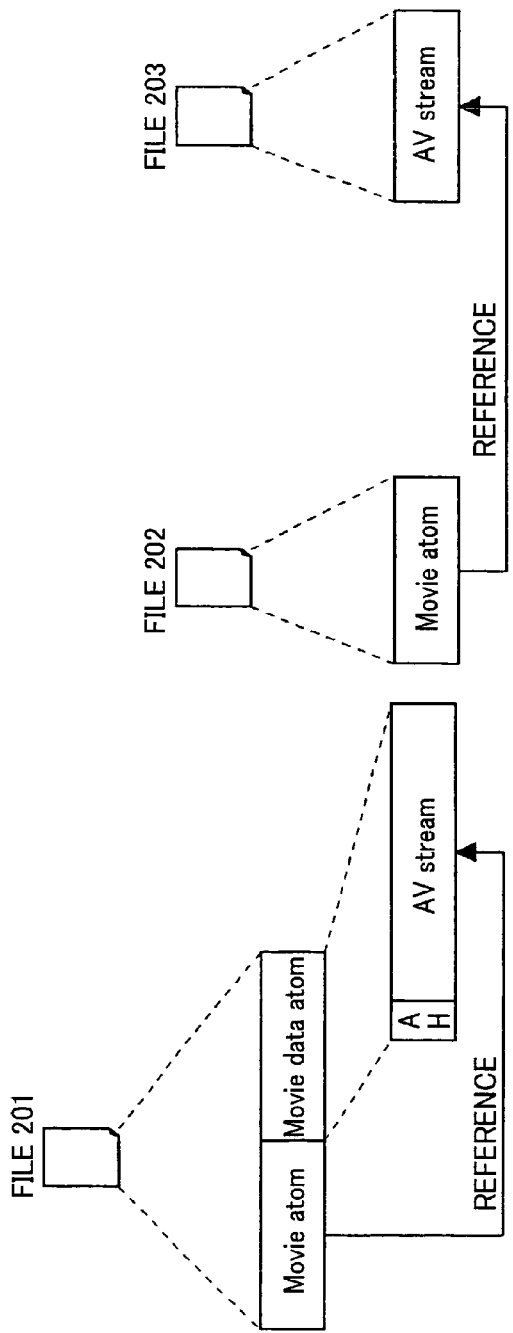
FIG. 2 (a)
FIG. 2 (b)
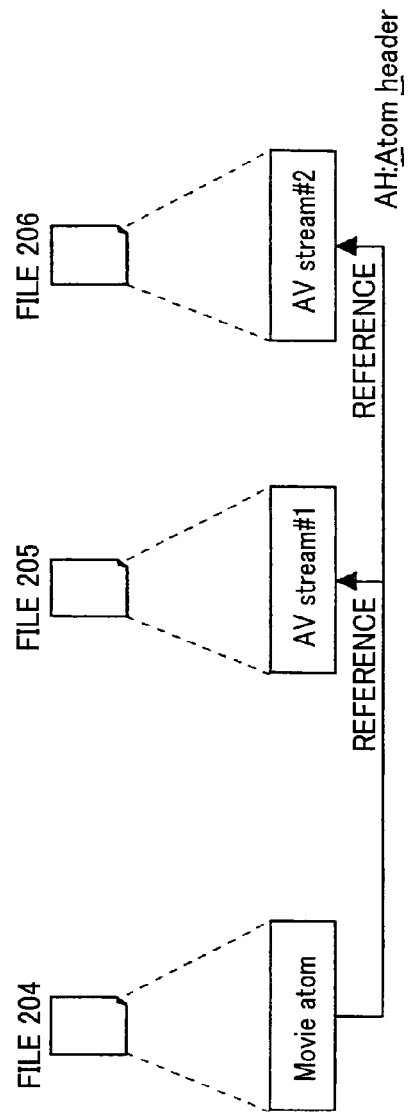
FIG. 2 (c)

FIG. 3

```
Movie atom {
        Atom size
        Type(='moov')
        Movie header atom
        Track atom (video track)
        Track atom (main audio track)
                :
        User data atom
}
```

FIG. 4

```
Track atom {
        Atom size
        Type(='trak')
        Track header  atom
        Edit atom
        Track reference atom
        Media atom
        User data atom
                :
}
```

FIG. 5

```
Track header atom {
        Atom size
        Type(='tkhd')
        Version
        Flags
        Creation time
        Modification time
        Track ID
        Reserved
        Duration
        Reserved
        Layer
        Alternate group
        Volume
        Reserved
        Matrix structure
        Track width
        Track height
}
```

FIG. 6

```
Media atom {
        Atom size
        Type(='mdia')
        Media header  atom
        Handler reference atom
        Media information atom
        User data atom
                :
}
```

FIG. 7

```
Media information atom {
    Atom size
    Type(='minf')
    {Video or Sound or Base} media information header atom
    Handler reference atom
    Data information atom
    Sample table atom
}
```

FIG. 8

```
Sample table atom {
        Atom size
        Type(='stbl')
        Sample description atom
        Time-to-sample atom
        Sync sample atom
        Sample-to-chunk atom
        Sample size atom
        Chunk offset atom
}
```

FIG. 10

```
Edit atom {
        Atom size
        Type(='edts')
        Edit list atom
}

Edit list atom {
        Atom size
        Type(='elst')
        Versions
        Flags
        Number of entries(=N)
        for (i = 0; i < N; i++){
                Track duration
                Media time
                Media rate
        }
}
```

FIG. 12

```
User data atom {
        Atom size
        Type(='udta')
        for (i=0;i<N; i++){
                Atom size
                Type
                User data
        }
}
```

AAU: Audio Access Unit
SH: Sequence Header

FIG. 18

```
Property Entry {
        version
        pe-flags
        parent-entry-number
        entry-number
        set-dependent-flags
        user-private-flags
        reserved
        creation-time
        modification-time
        duration
        binary-file-identifier
        referred-counter
        referring file list
        URL file identifier
}
```

FIG. 19

| Bit | Flag Name | Value | Description |
|---|---|---|---|
| 0 | Attribute of Entry | 0 | original property entry |
|   |   | 1 | favorite property entry |
| 1 | Type of Entry | 0 | file property entry |
|   |   | 1 | folder property entry |
| 2 | Usage of Entry | 0 | normal use |
|   |   | 1 | system use |
| 3 | Status of Entry | 0 | available |
|   |   | 1 | invalid |
| 4 | Data reference of corresponding AV File | 0 | without external-reference or any reference |
|   |   | 1 | with external-reference |
| 5 | Structural status of corresponding AV File | 0 | normal use |
|   |   | 1 | auto-divided |
| 6:14 | reserved | 0 |   |
| 15 | Security status of corresponding AV File | 0 | non-secured |
|   |   | 1 | secured |
| 16:23 | Content type of corresponding AV File | 0x00 | video |
|   |   | 0x01 | snapshot |
|   |   | 0x02 | music |
|   |   |   | reserved |

FIG. 25

| Bit | Flag Name | Value | Description |
|---|---|---|---|
| 0 | Attribute of Entry | 0 | original property entry |
| | | 1 | favorite property entry |
| 1 | Type of Entry | 0 | file property entry |
| | | 1 | folder property entry |
| 2 | Usage of Entry | 0 | normal use |
| | | 1 | system use |
| 3 | Status of Entry | 0 | available |
| | | 1 | invalid |
| 4 | Data reference of corresponding AV File | 0 | without external-reference or any reference |
| | | 1 | with external-reference |
| 5 | Structural status of corresponding AV File | 0 | normal use |
| | | 1 | auto-divided |
| 6 | Type of corresponding AV File | 0 | original |
| | | 1 | derived |
| 7:14 | reserved | 0 | |
| 15 | Security status of corresponding AV File | 0 | non-secured |
| | | 1 | secured |
| 16:23 | Content type of corresponding AV File | 0x00 | video |
| | | 0x01 | snapshot |
| | | 0x02 | music |
| | | | reserved |

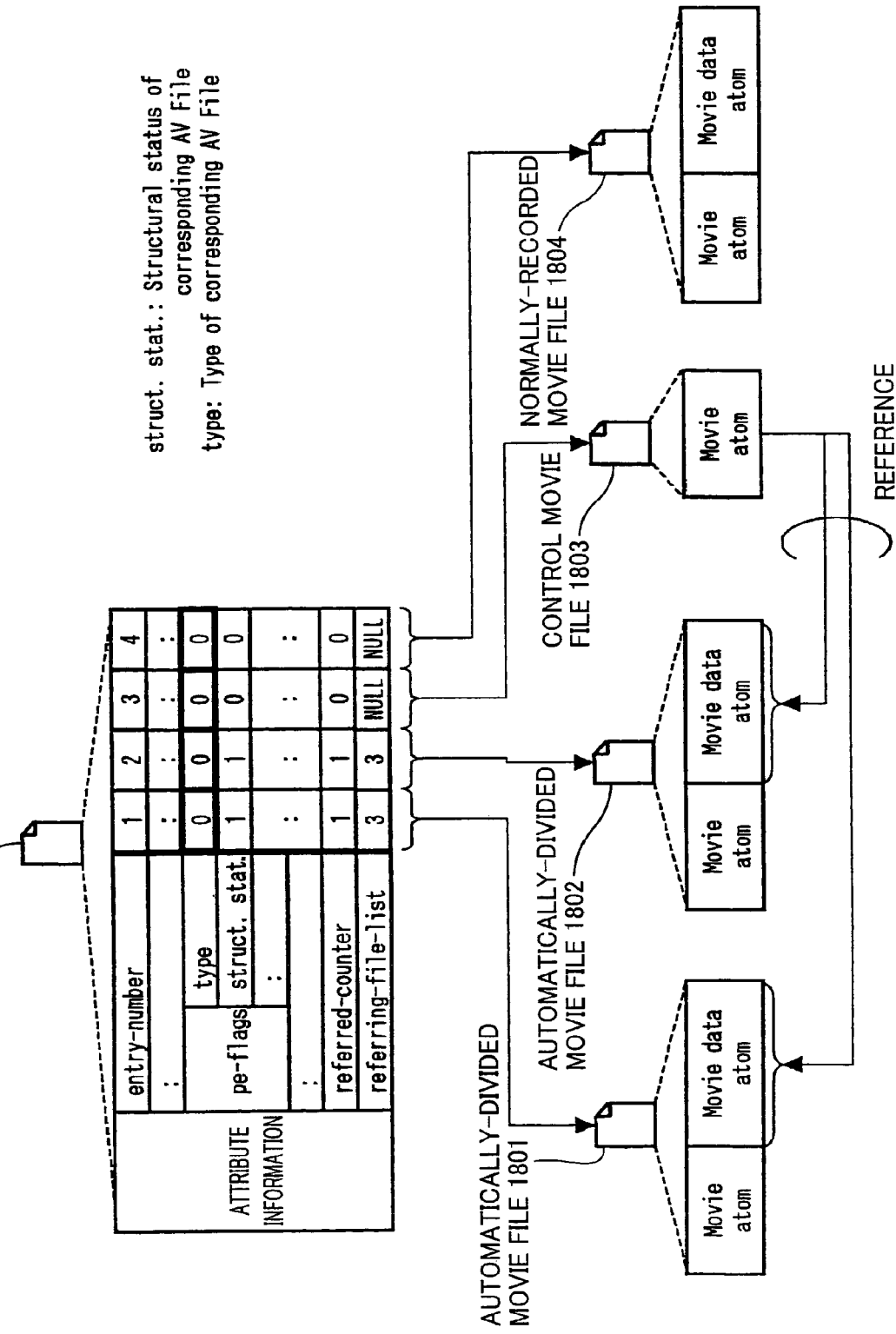

FIG. 28

| Bit | Flag Name | Value | Description |
|---|---|---|---|
| 0 | Attribute of Entry | 0 | original property entry |
| | | 1 | favorite property entry |
| 1 | Type of Entry | 0 | file property entry |
| | | 1 | folder property entry |
| 2 | Usage of Entry | 0 | normal use |
| | | 1 | system use |
| 3 | Status of Entry | 0 | available |
| | | 1 | invalid |
| 4 | Data reference of corresponding AV File | 0 | without external-reference or any reference |
| | | 1 | with external-reference |
| 5 | Structural statua of corresponding AV File | 0 | normal |
| | | 1 | auto-divided |
| 6 | Type of corresponding AV File | 0 | original |
| | | 1 | derived |
| 7 | Visual status of corresponding AV File | 0 | visible |
| | | 1 | invisible |
| 8:14 | reserved | 0 | |
| 15 | Security status of corresponding AV File | 0 | non-secured |
| | | 1 | secured |
| 16:23 | Content type of corresponding AV File | 0x00 | video |
| | | 0x01 | snapshot |
| | | 0x02 | music |
| | | | reserved |

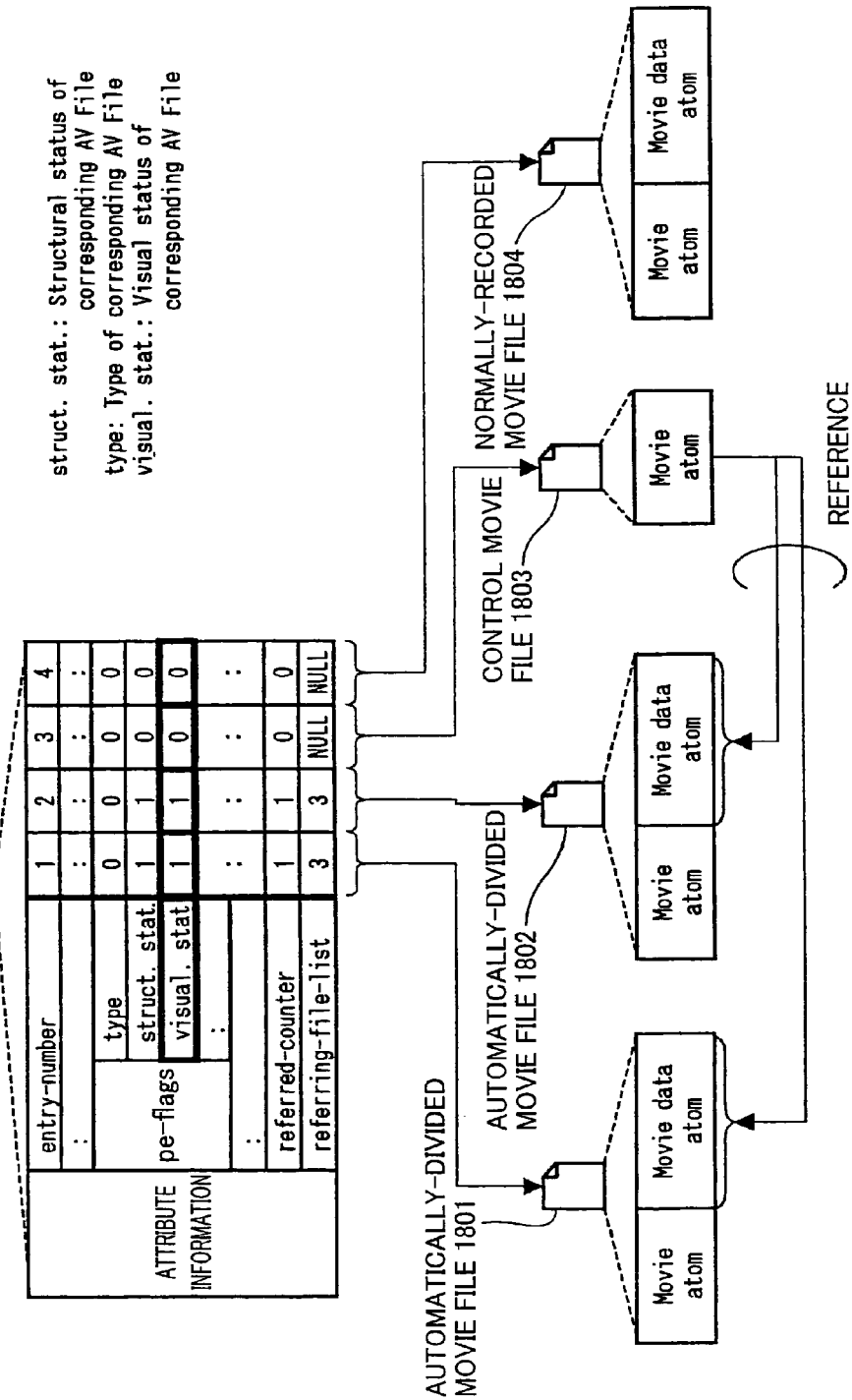

FIG. 30
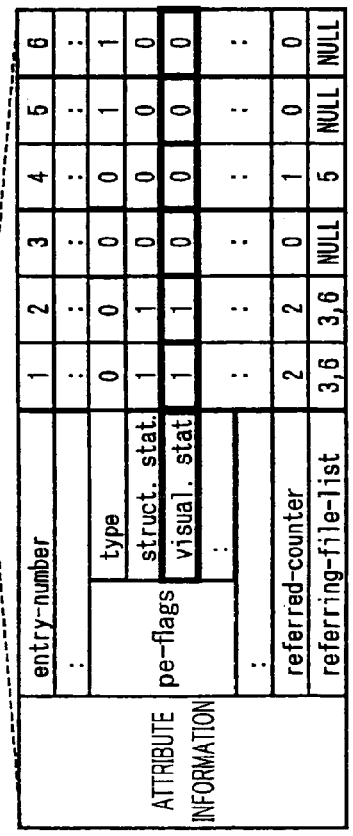
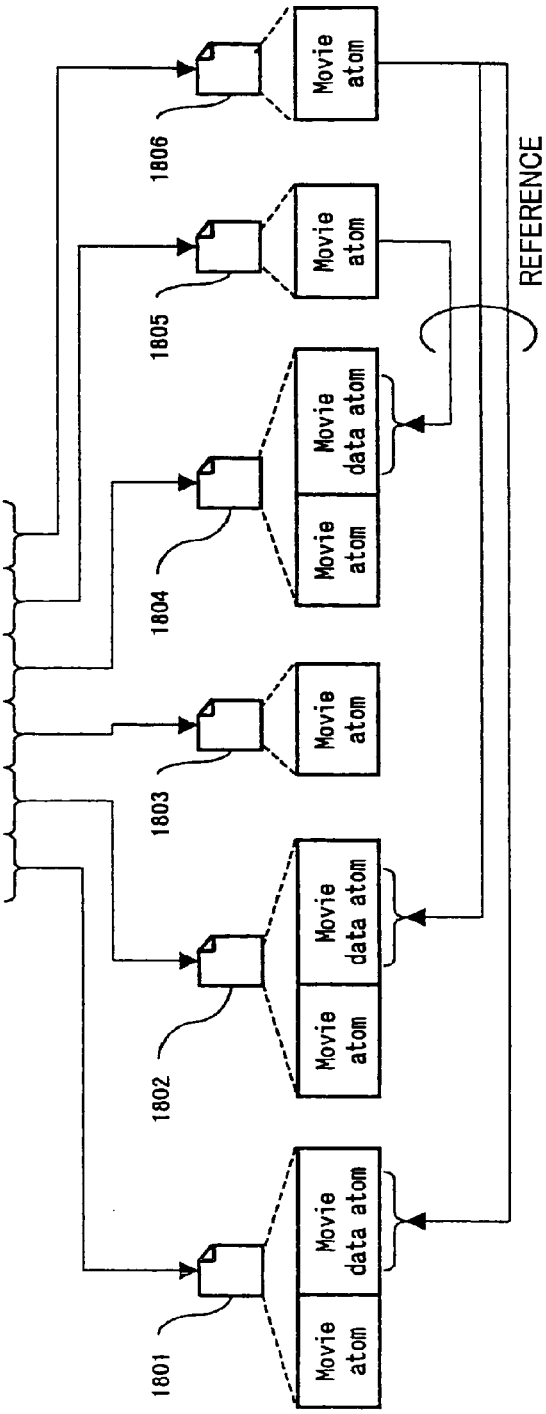

DATA MANAGEMENT METHOD USING A TABLE, AND RELATED STORAGE DEVICE, STORAGE MEDIUM AND PROGRAM

CROSS-REFERENCE TO RELATED APPLICATION(S)

This application is a divisional of copending application U.S. Ser. No. 10/497,288 filed on May 28, 2004, which is a National Phase entry of PCT International application number PCT/JP02/12398 filed on Nov. 27, 2002, which claims priority to Japanese application number 2001-363587 filed on Nov. 29, 2001.

FIELD OF THE INVENTION

The present invention relates to a data recording method, data erasure method, data display method, storage device, storage medium, and program, concerning recording/erasing video or audio data to/from a random-access storage medium such as a hard disk and an optical disk.

BACKGROUND OF THE INVENTION

Digital video recording/reproducing devices (hereinafter, video disk recorder) adopting disks as media have become popular. A recording format for such devices is often the Quicktime® file format or the AVI (Audio Video Interleave) file format, in consideration of compatibility with PCs (personal computers).

Japanese Laid-Open Patent Application No. 2001-84705 (Tokukai 2001-84705; published on Mar. 30, 2001) discloses a method for managing contents in a disk when the above-mentioned file format for PCs is adopted. Referring to FIG. 33, an outline of this method is given. Files 2101 through 2103 of a disk 2105 correspond to respective scenes or shots being recorded, and each of these files is one Quicktime file (hereinafter, Quicktime movie file).

An index file 2100 stores a table of data in the disk 2105. There are entries corresponding to the respective Quicktime movie files. Each entry stores sets of reduced (thumbnail) image data 2111 through 2113 representing respective scenes, and the names of files including these scenes.

To display an index to the user, miniature images 2121 through 2123 produced by decoding the sets of miniature image data 2111 through 2113 in the entry are caused to appear on a contents selection display 2107. The user then selects a file that he/she wants to reproduce or edit, from these miniature images on the contents selection display 2107. When, for instance, the user selects the miniature image 2123 and instructs the reproduction of the same, a file 2103 including the contents corresponding to the miniature image 2123 is acquired and the reproduction of the contents in the file 2103 starts.

The index file 2100 includes (i) pointers to respective files storing the contents of the disk 2105 and (ii) sets of miniature image data. Thus, the contents selection display 2107 can be shown only be reading out the index file 2100 from the disk 2105, so that the time required for causing the index display (contents selection display) to appear on the screen is short. As the contents selection display 2107 is frequently called, this reduction of the time greatly lighten the frustration of the user.

It should be noted that, however, the above-mentioned conventional art could make the user feel puzzled about the management of a reference movie.

The adoption of a file formant for PCs makes it difficult to deal with large-volume video data. Since the Quicktime file format and the AVI file format manage addresses with 32-bit information, the maximum file size is $2^{32}$, i.e. about 4 GB (gigabyte). The maximum recording time for recording video data with a bit rate of 10 Mbps is less than 60 minutes, thereby not to be sufficient for recording TV programs and the like.

To solve this problem, a method termed "reference movie" shown in FIG. 34 is adopted. The following will discuss this reference movie. First, a reference movie is produced by the following steps (1) through (4): (1) From the start of the recording, data is recorded to the file 2201; (2) when an amount of data in the file 2201 approaches to the maximum file size thereof, the recording to the file 2201 is stopped and subsequent data is recorded to the next file 2202; (3) when an amount of data in the file 2202 approaches to the maximum file size thereof, subsequent data is recorded to the next file 2203 in the same manner as above; (4) when the recording completes, management information is generated and stored in the file 2204.

To reproduce the recorded contents, the file 2204 is designated, and in accordance with the management information stored therein, the contents in the files 2201 through 2203 are reproduced in sequence. To allow the contents be reproduced even if the file 2204 is deleted, the files 2201 through 2203 also include the management information. In the present case, the files 2201 through 2203 are termed automatically-divided movie files, and the file 2204 is termed a control movie file.

Managing such a reference movie (automatically-divided movie and control movie) by the above-mentioned method using the index file causes a problem which will be discussed below with reference to FIG. 35. Assuming that the files 2201 through 2204 are registered to the index file 2100 with the sets of miniature image data representing the respective files, the representative images 2221 through 2224 corresponding to the files 2201 through 2204 appear on the contents selection display 2107. This makes the user feel puzzled, because four representative images appear even if the user recorded only one scene.

Also on the occasion of erasing the reference movie, four representative images appears with respect to one scene, causing the erasing process to be ambiguous.

The present invention was done to solve this problem, and thus aims for providing a data recording method, data erasure method, data display method, storage device, storage medium, and program, which allow the user to manage a reference movie by an index file, with no perplexity.

SUMMARY OF THE INVENTION

To achieve the above-identified objective, a data erasure method of the present invention, for erasing a set of data corresponding to an entry in a table from a storage medium, the table being stored in the storage medium and centrally managing sets of data at least including sets of divided data and control data referring to said sets of divided data, comprises the step of: (i) when said set of data is erased, identifying whether or not said set of data corresponding to said registered entry is initially-recorded data.

To achieve the above-identified objective, the data erasure method of the present invention is arranged in such a manner that, the step (i) is carried out based on (I) information regarding whether or not said data managed by said registered entry has been divisional-recorded, (II) information regarding a relationship with data managed by another entry, and (III) a creation time of said set of data.

To achieve the above-identified objective, a data recording method of the present invention, which centrally manages sets of data as respective entries, to a storage medium, is characterized in that, to each of said entries, information regarding whether or not a set of data managed by the entry is initially-recorded data is recorded.

To achieve the above-identified objective, a data recording method of the present invention, which centrally manages sets of data as respective entries, to a storage medium, is characterized in that, to each of said entries, information regarding whether or not presence of data managed by the entry is presented to a user is recorded.

To achieve the above-identified objective, the data recording method of the present invention is arranged in such a manner that, said sets of data include at least sets of divided data and control data referring to said sets of divided data.

To achieve the above-identified objective, the data recording method of the present invention is arranged in such a manner that, to each of the entries, information regarding a relationship with data managed by another entry is recorded.

To achieve the above-identified objective, the data recording method of the present invention is arranged in such a manner that the table is stored in a file.

To achieve the above-identified objective, a data erasure method of the present invention erases a set of data corresponding to an entry in a table from a storage medium, the table being stored in the storage medium and centrally managing, as respective entries, sets of data at least including sets of divided data and control data referring to said sets of divided data, the data erasure method being characterized in that, in the storage medium, information for identifying initially-recorded data is recorded to said entry corresponding to said set of data to be erased, and the data erasure method being characterized by comprising the step of: when erasing said set of data, determining whether or not said set of data is erasable, based on information regarding whether or not said set of data to be erased is the initially-recorded data and information regarding a relationship with data managed by another entry.

To achieve the above-identified objective, a data erasure method of the present invention erases a set of data corresponding to an entry in a table from a storage medium, the table being stored in the storage medium and centrally managing sets of data as respective entries, the data erasure method being characterized in that, in the storage medium, (a) information regarding whether or not presence of said set of data is presented to a user and (b) information regarding a relationship with data managed by another entry are recorded to said entry corresponding to said set of data to be erased, and the data erasure method being characterized by comprising the step of: when erasing said set of data, altering the information (a) in accordance with the information (b).

To achieve the above-identified objective, a data display method of the present invention, for reading out a table from a storage medium and displaying the table, the table being stored in the storage medium and centrally managing sets of data as respective entries, is characterized in that, in the storage medium, (A) information regarding whether or not presence of said set of data is presented to a user is recorded to said entry corresponding to said set of data, and in what way the table is displayed is determined in accordance with the information (A).

To achieve the above-identified objective, a storage device of the present invention, for recording, to a storage medium, a table which centrally manages sets of data as respective entries, is characterized by comprising: means for recording, to each of said entries, information regarding whether or not data managed by the entry is initially-recorded data.

To achieve the above-identified objective, a storage device of the present invention, for recording, to a storage medium, a table which centrally manages sets of data as respective entries, is characterized by comprising: means for recording, to each of said entries, information regarding whether or not presence of data managed by the entry is presented to a user.

To achieve the above-identified objective, a storage medium of the present invention, to which a table for centrally managing sets of data as respective entries is recorded, is characterized in that, in each of said entries, information regarding whether of not data managed by the entry is initially-recorded data is recorded.

To achieve the above-identified objective, a storage medium of the present invention, to which a table for centrally managing sets of data as respective entries is recorded, is characterized in that, in each of said entries, information regarding whether or not presence of data managed by the entry is presented to a user is recorded.

To achieve the above-identified objective, a program of the present invention causes a computer to implement any one of the above-described data erasure methods or any one of the above-described data recording methods.

A storage medium of the present invention is a computer-readable storage medium recording the foregoing program.

According to the present invention, information for determining whether or not a file recorded to the disk is an automatically-divided movie file and information regarding for determining whether or not a file is original are used as bases for making decision. Thus, even if an automatically-divided movie file exists, erasure is carried out without causing the user to feel perplexed.

Furthermore, according to the present invention, information for determining whether or not a file is original is recorded to a disk. Thus, even if an automatically-divided movie file exists, erasure is carried out without causing the user to feel perplexed.

Furthermore, according to the present invention, information for determining whether or not an AV file corresponding to an entry is presented to the user is recorded to a disk. Thus, the user can apparently erase arbitrary contents even if the file reference has been made.

For a fuller understanding of the nature and advantages of the invention, reference should be made to the ensuing detailed description taken in conjunction with the accompanying drawings.

BRIEF DESCRIPTION OF DRAWINGS

FIG. 2(a) illustrates an example of the relationship between management information and an AV stream in the Quicktime file format, FIG. 2(b) shows another example of the relationship between management information and an AV stream in the Quicktime file format, and FIG. 2(c) shows a further example of the relationship between management information and an AV stream in the Quicktime file format.

FIG. 3 illustrates an outline of a Movie atom in the Quicktime file format.

FIG. 4 illustrates an outline of a Track atom in the Quicktime file format.

FIG. 5 illustrates a structure of a Track header atom in the Quicktime file format.

FIG. 6 illustrates a structure of a Media atom in the Quicktime file format.

FIG. 7 illustrates a structure of a Media information atom in the Quicktime file format.

FIG. 8 illustrates a structure of a Sample table atom in the Quicktime file format.

FIG. 10 illustrates a structure of an Edit atom in the Quicktime file format.

FIG. 12 illustrates a structure of a User data atom in the Quicktime file format.

FIG. 18 shows a structure of attribute information.

FIG. 19 shows pe-flags in First Embodiment of the present invention.

FIG. 25 illustrates pe-flags of Second Embodiment of the present invention.

FIG. 26 illustrates attribute information after recording in Second Embodiment of the present invention.

FIG. 28 illustrates pe-flags of Third Embodiment of the present invention.

FIG. 29 illustrates attribute information after recording in Third Embodiment of the present invention.

FIG. 30 illustrates the attribute information after nondestructive editing in Third Embodiment of the present invention.

DETAILED DESCRIPTION OF THE INVENTION

Embodiments of the present invention will be described below with reference to the attached figures. Arrangements shared by all embodiments will be discussed first, and then descriptions specific to respective embodiments will be given.

System Configuration

Figure 1:
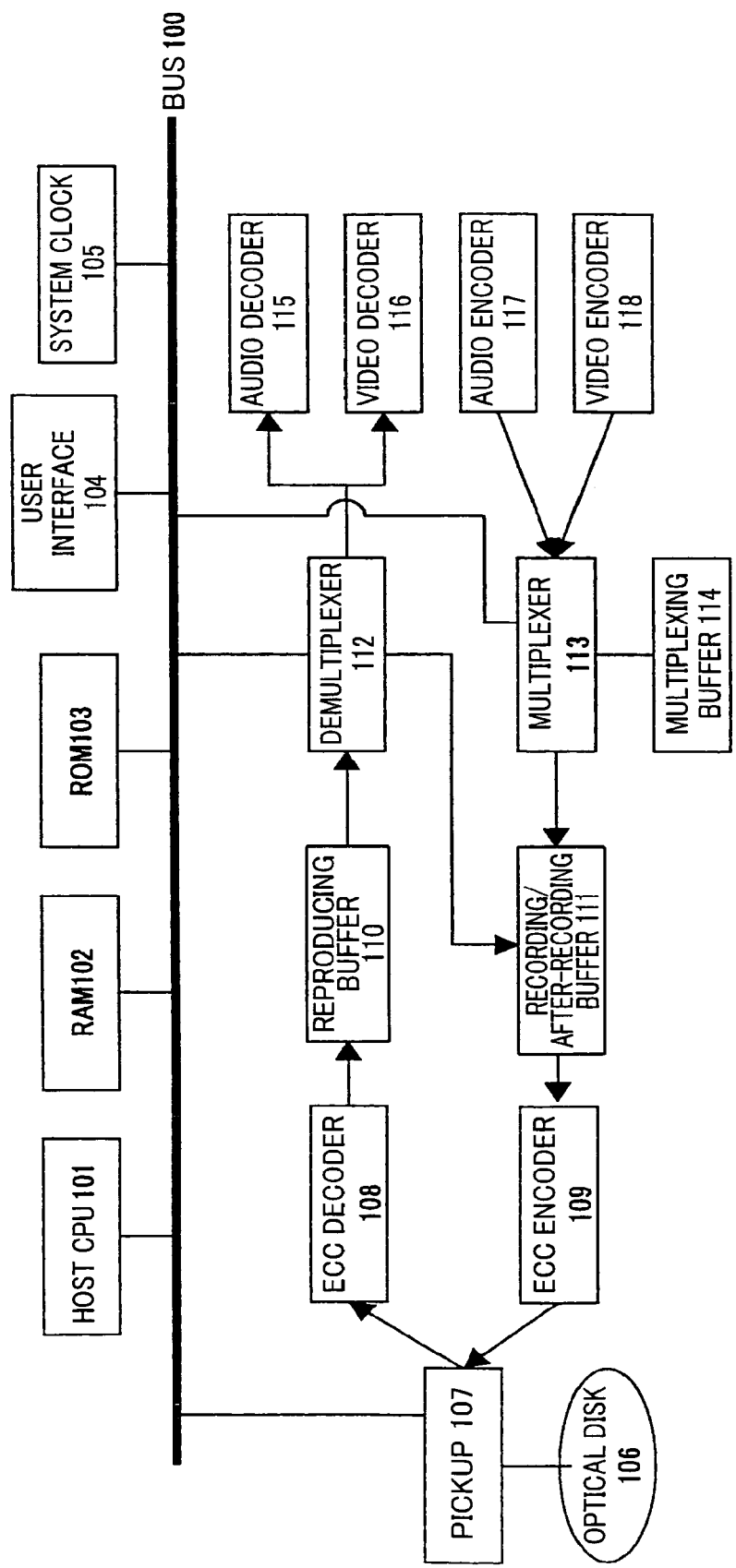
FIG. 1 is a block diagram showing an outline of a digital recording/reproducing device of an embodiment of the present invention.
Figure 9:
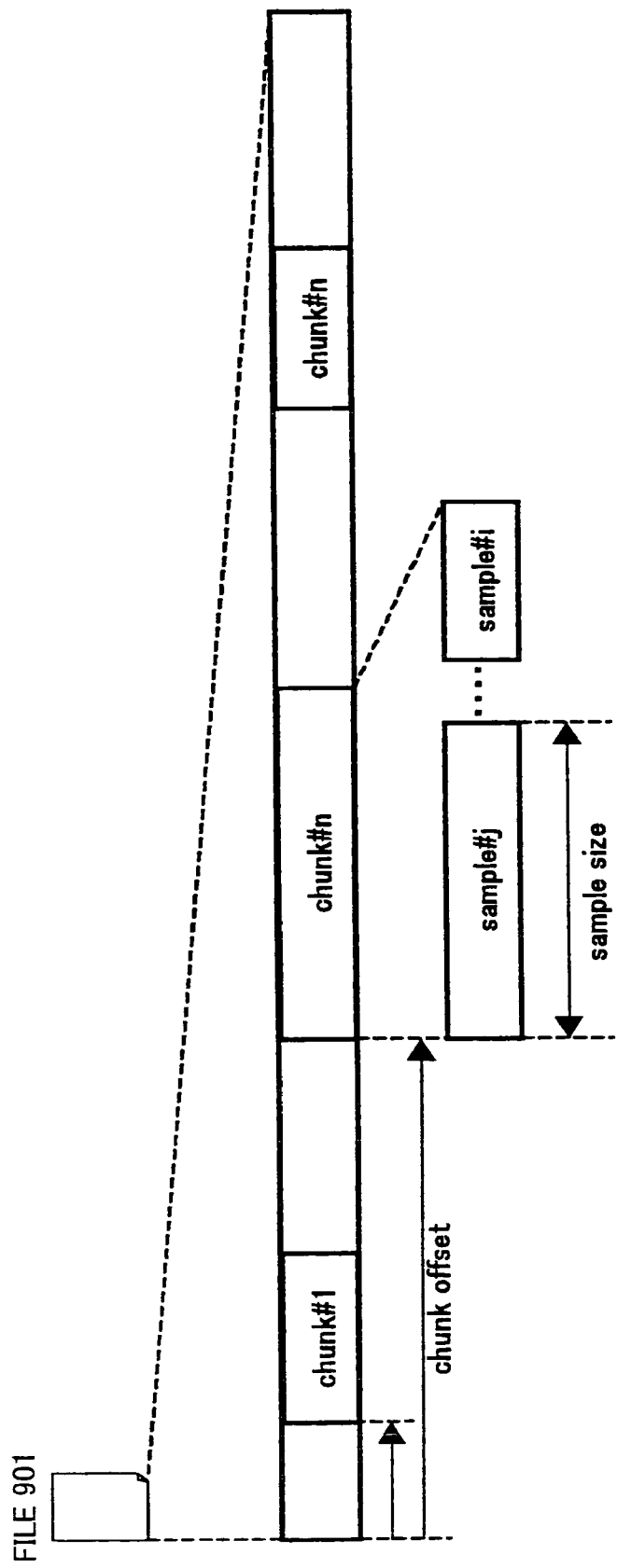
FIG. 9 shows an example of data management using the Sample table atom.

FIG. 1 shows a structure of a digital video recording/reproducing device (video disk recorder) adopting disks as media. As shown in FIG. 1, this device, which is shared by all embodiments of the present invention, includes a bus 100, host CPU 101, RAM 102, ROM 103, user interface 104, system clock 105, optical disk 106, pickup 107, ECC (Error Correcting Coding) decoder 108, ECC encoder 109, reproducing buffer 110, recording/after-recording buffer 111, demultiplexer 112, multiplexer 113, multiplexing buffer 114, audio decoder 115, video decoder 116, audio encoder 117, video encoder 118, and other members which are not illustrated in the figure, such as a camera, microphone, speaker, and display. Note that, the after-recording is an operation to add audio data to video data which is initially recorded.

The host CPU 101 controls, through the bus 100, the demultiplexer 112, multiplexer 113, pickup 107, audio decoder 115, video decoder 116, audio encoder 117, and video encoder 118 (despite the members 115 through 118 are not connected to the bus 100 in the figure).

On the occasion of reproduction, data being read out from the optical disk 106 by the pickup 107 is subjected to error-correction in the ECC decoder 108, and temporarily held in the reproducing buffer 110. In response to a data transmission request from the audio decoder 115 and video decoder 116, the host CPU 101 instructs the demultiplexer 112 to distribute sets of data in the reproducing buffer 110 to decoders appropriate to the respective types of data, with reference to management information regarding the data being reproduced.

In the meantime, on the occasion of recording, data having been compressed and coded by the audio encoder 117 and video encoder 118 is supplied to the multiplexing buffer 114, AV-multiplexed by the multiplexer 113, and then supplied to the recording/after-recording buffer 111. The ECC encoder 109 adds an error-correction code to the data held in the recording/after-recording buffer 111, and then the data is recorded to the optical disk 106 by the pickup 107.

In the present case, audio data is coded with the MPEG-1 Layer-II, while video data is coded with the MPEG-2.

The optical disk 106 is a removable optical disk in which data is read out or recorded from the periphery to the center in a spiral manner. One sector is made up of 2048 bytes, and an ECC block is made up of 16 sectors for the sake of error-correction. To rewrite data in the ECC block, it is necessary to carry out the following steps: the whole ECC block including that data is read out, error-correction is carried out so that the data is rewritten, the error-correction code is added again, an ECC block is constructed and then recorded in a storage medium. The optical disk 106 adopts the ZCAV (Zone Constant Angular Velocity) in order to improve the efficiency of the recording, so that a recording area is made up of a plurality of zones having different rotation speeds.

File System

A file system is used for managing various types of information recorded in the optical disk 106. As such file system, the UDF (Universal Disk Format) is adopted in consideration of the compatibility with PCs (personal computers). In this file system, all sorts of management information and AV streams are dealt with as files.

In the above-described video disk recorder, the host CPU 101 carries out the recording of data to the optical disk 106 and the reproduction of data from the optical disk 106, using the file system. That is to say, the host CPU 101 functions as a file management section which records, reproduces, and erases data using file management information of the file system. Information regarding files, e.g. attribute information of a file, is also recorded to the optical disk 106 and read out from the optical disk 106 under the control of the host CPU 101.

A user area is managed with a 2048-byte logical block (one-to-one corresponding to the sector). Each file is made up of an integral number of extents (consecutive logical blocks). A file may be recorded in such a manner that its extents are recorded in different locations. A free area is managed in logical blocks by Space Bitmap.

File Format

A Quicktime file format is adopted as a format for AV stream management. This Quicktime format which was created by Apple Computer, Inc. is a popular format for multimedia data management in the realm of PCs.

The Quicktime format is made up of data such as video data and audio data (collectively termed media data or AV stream) and management information. In the present case, the data and management information are paired up and termed a Quicktime movie ("movie" for short). The data and management information being paired up may be stored in one file or in different files.

When being stored in one file, the data and management information are arranged as shown in FIG. 2(*a*). Different types of information are stored in respective "atoms" which are based on a common structure. The management information is stored in "Movie atom", while the media data is stored in "Movie data atom". Note that, the management information in the Movie atom includes: a table for identifying a relative location of the media data in the file at a certain time; attribute information of the media data; below-mentioned external reference information; and so on. In other words, the management information in the Movie atom includes a table for, for instance, centrally managing sets of data as entries.

When being stored in different files, the management information and media data are arranged as shown in FIG. 2(*b*). In this case, while the management information is stored in the Movie atom, the media data is not necessarily stored in an atom. This condition is described as the Movie atom "externally refers to" the file storing the media data.

As illustrated in FIG. 2(*c*), it is possible to externally refer to a plurality of AV stream files. This makes it possible to realize "nonlinear editing", i.e. "nondestructive editing" which enables the user to apparently carry out editing without changing the locations of AV streams.

Now, a format of management information in Quicktime will be discussed with reference to FIGS. 3 through 12. First, "atom", which is a common information storing format, is described. At the head of an atom, "Atom size" indicating the size of the atom and "Type" indicating the type of the atom always exist. Four characters are given to each Type, e.g. 'moov' for the Movie atom and 'mdat' for the Movie data atom.

Each atom can include another atom, i.e. atoms are arranged in a hierarchy. FIG. 3 shows how the Movie atom is structured. "Movie header atom" manages overall attribute of the movie managed by the Movie atom. "Track atom" stores information concerning tracks such as a video track and an audio track in the movie. "User data atom" is a user-defined atom.

FIG. 4 shows how the Track atom is structured. "Track header atom" manages overall attribute of the track. "Edit atom" determines which part of the media data is reproduced at which timing of the movie. "Track reference atom" manages the relationship between the own track and another track. "Media atom" manages data such as video data and audio data.

FIG. 5 shows how the Track header atom is structured. Note that, descriptions are given only to those required for the discussion below. "Flags" is a collection of flags indicating attributes. A major example of such flag is "Track enabled flag". When this flag is 1, the track having the flag is reproduced. On the other hand, when the flag is 0, the track is not reproduced. "Layer" indicates a spatial priority of the track having the Layer. When there are a plurality of tracks for displaying an image, a track having a Layer with smaller value comes in front. "Edit atom" will be described later.

FIG. 6 shows how the Media atom is structured. "Media header atom" manages overall attribute and the like concerning media data managed by the Media atom. "Handler reference atom" stores information indicating which decoder decodes the media data. "Media information atom" manages attribute information peculiar to each video/audio media data.

FIG. 7 shows how the Media information data is structured. "Media information header atom" manages attribute information peculiar to each video/audio media data. "Handler reference atom" has already been described in association with the Media atom. "Data information atom" includes "Data reference atom" which manages the name of a file including media data to which the Quicktime movie refers. "Sample table atom" manages the size of data, reproduction time, and the like.

Next, how the Sample table atom is structured will be discussed with reference to FIG. 8. First, a method of managing data in Quicktime is described with reference to FIG. 9. In Quicktime, a minimum unit of data (e.g. video frame) is termed "sample". For each track, samples have numbers (sample numbers) starting from 1, which indicate the order of reproduction.

Also, in the Quicktime format, the reproduction time and data size of each sample are in control. A field in a file, in which samples pertaining to one track are successively provided in the order of reproduction, is termed "chunk". Chunks also have numbers starting from 1, which indicate the order of reproduction.

In the Quicktime format, moreover, the address of each chunk, the address being counted from the head of the file, and the number of samples in each chuck are in control in accordance with such information, the location of a sample corresponding to a particular time is figured out.

FIG. 8 shows how the Sample table atom is structured. A Sample description atom manages a Data format of each chunk, an Index of the chunk of the file in which the sample is stored, and the like. A Time-to-sample atom manages a reproduction time of each sample.

"Sync sample atom" manages samples that can be decoded. "Sample-to-chunk atom" manages the number of samples in each chunk. "Sample size atom" manages the size of each sample. "Chunk offset atom" manages the address of each chunk, the address being counted from the head of the file.

Now, a briefing on "Edit atom" is given. As shown in FIG. 10, the Edit atom includes one "Edit list atom". This Edit list atom has entries in each of which values of "Track duration", "Media time", and "Media rate" are provided. The number of the entries is designated by "Number of entries". The entries correspond to fields which are successively reproduced on the track, and the order of the entries correspond to the order of reproduction of the fields.

The Track duration indicates the reproduction time of a field on the track, the field being managed by the entry. The Media time indicates the location of the head of the field on the media data. The Media rate indicates the speed of reproducing the field. Note that, when the Media time is −1, the reproduction of samples on that track is paused for the Track duration of the entry. This field is termed "empty edit".

In this manner, in the Quicktime file format, the Edit atom, which is included in the Track atom in the Movie atom storing the management information, includes the Edit list atom for centrally managing sets of data as entries.

Figure 11:
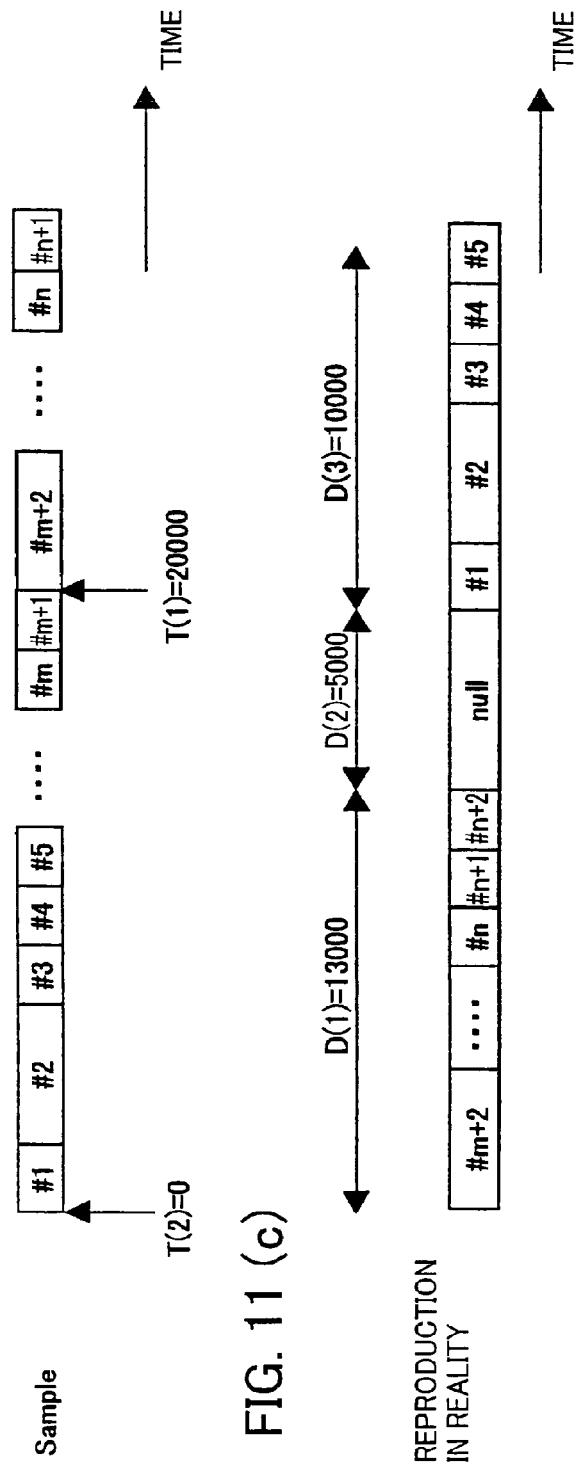
FIG. 11(a) shows the content of an Edit list atom.
FIG. 11(b) shows an example of a sample.
FIG. 11(c) shows the order of reproducing the sample.

FIG. 11 shows an example illustrating how the Edit list is used. FIGS. 11(a), 11(b), and 11(c) illustrate an example of reproduction range specification by the Edit atom. In the present case, the contents of the Edit list atom are as shown in FIG. 11(a), and the structure of a sample is as shown in FIG. 11(b). Also, it is assumed that the Track duration of the i-th entry is D(i), the Media time of the i-th entry is T(i), and the Media rate of the i-th entry is R(i). The reproduction of samples is in reality carried out in the order shown in FIG. 11(c). These assumptions are now briefly described.

First, in the entry #1, the Track duration is 13000, the Media time is 20000, and the Media rate is 1. Thus, in the field from the head of the track to 13000, the field from the time 20000 to the time 33000 in the sample is reproduced. Next, in the entry #2, the Track duration is 5000 and the Media time is −1. Thus, in the field from the time 13000 to the time 18000 in the track, no reproduction is carried out.

At the end, in the entry #3, the Track duration is 10000, the Media time is 0, and the Media rate is 1. Thus, from the time 18000 to the time 28000 of the track, the field form the time 0 to the time 10000 in the sample is reproduced.

FIG. 12 shows how the User data atom is constructed. This atom can store an arbitrary number of sets of original information which are not defined by the Quicktime format. One set of original information is managed by one entry, and one entry is made up of "Size", "Type", and "User data". The Size indicates the sizes of the entry, the Type is an identifier for distinguishing between the sets of original information, and the User data indicates actual data.

Structure of AV Stream

Figure 13:
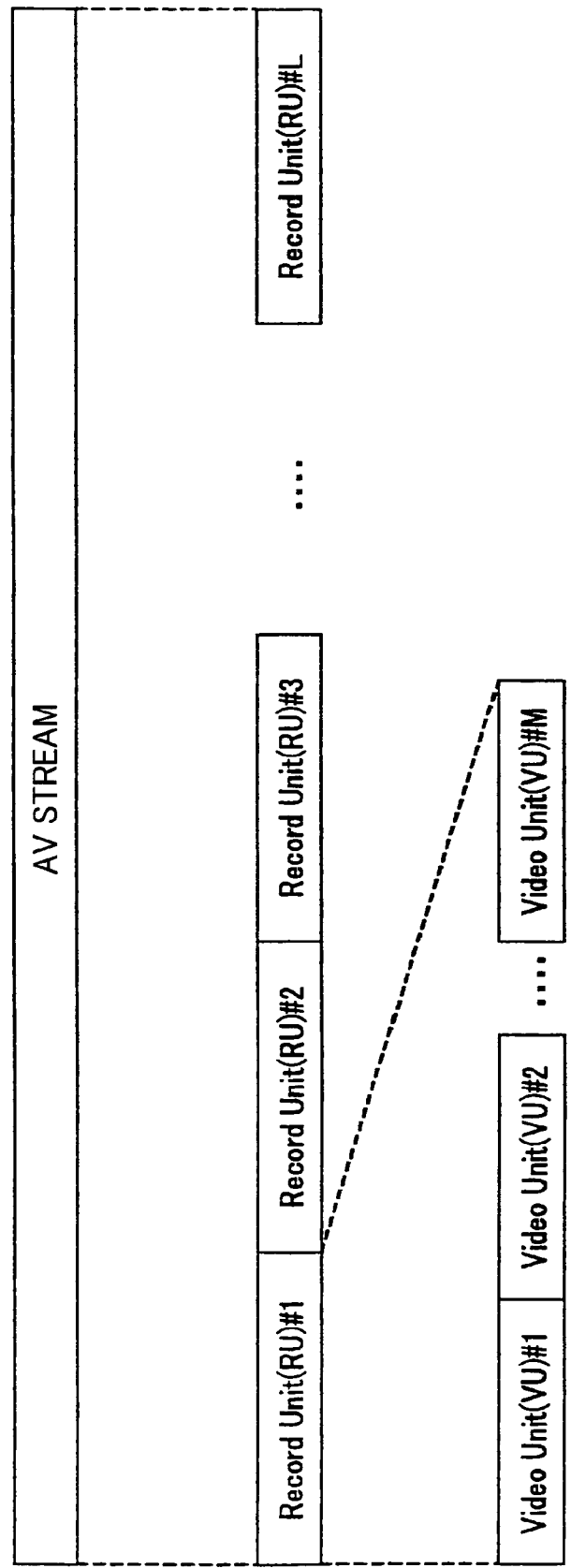
FIG. 13 illustrates a structure of an AV stream.
Figure 14:
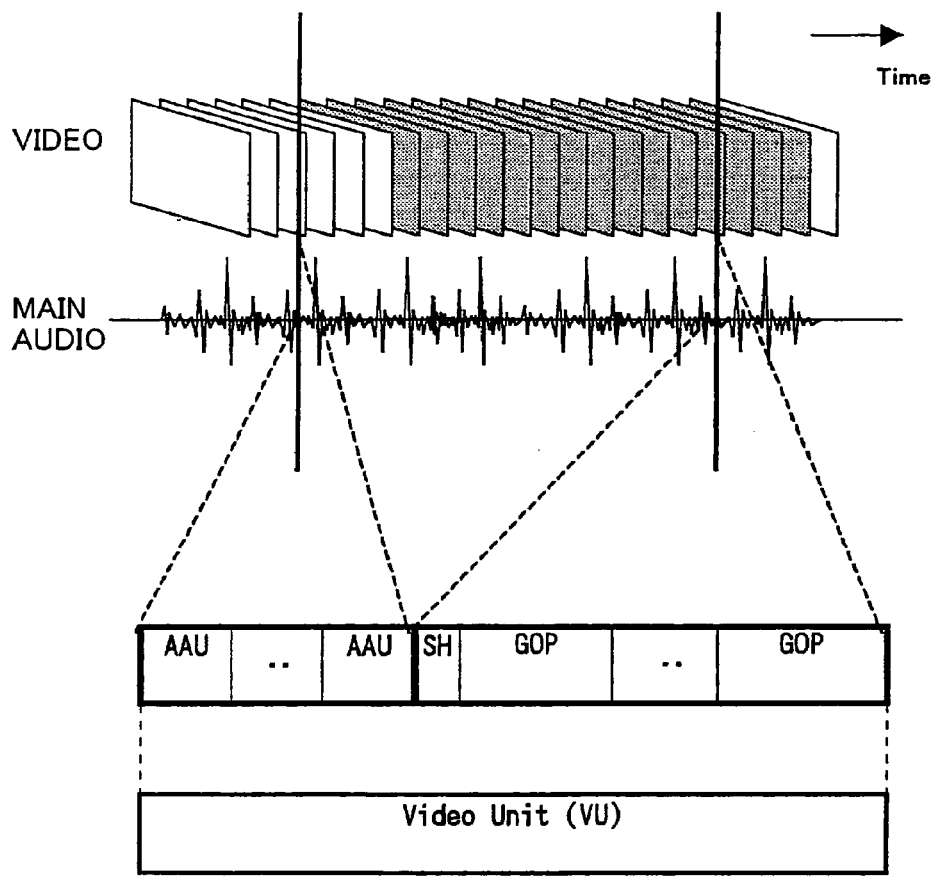
FIG. 14 illustrates a structure of a Video Unit (VU).

The following will describe how the AV stream which is common to all embodiments of the present invention, with reference to FIGS. 13 and 14. One AV stream is made up of an integral number of Record Units (RUs). An RU is a unit for sequential recording on the disk. The length of the RU is determined in such a manner as to assure seamless reproduction (images and sounds are reproduced without interruption) and real-time after-recording (sounds are recorded while the images to which the sounds are after-recorded are seamlessly reproduced) in whatever manner the RUs constituting the AV stream are provided on the disk. This determination of the length will be described later.

The stream is constructed in such a manner as to cause an RU border to correspond to an ECC block border. Since the RU has such characteristics, it is possible to easily change the locations of the RUs on the disk while keeping the seamless reproduction, even after recording the AV stream on the disk.

One RU is made up of an integral number of Video Units (VUs). A VU is a minimum unit that can be reproduced by itself, thereby being able to function as an entry point of the reproduction.

FIG. 14 shows how the VU is structured. One VU is made up of: an integral number GOPs (Group Of Pictures) each storing video data for about one second; and an integral number AAUs (Audio Access Units) each storing main audio data reproduced concurrently with the corresponding video data.

Note that, the GOP is a unit of video compression under the MPEG-2 video standard, and made up of a plurality of (typically about 15) video frames. The AAU is a unit of audio compression under the MPEG-1 Layer II standard, and made up of 1152 audio wave sample points. When a sampling frequency is 48 kHz, a reproduction time per AAU is 0.024 second. In the VU, the AAU and the GOP are provided in this order in order to reduce the delay required for carrying out audio/video synchronous reproduction.

To realize the reproduction of each VU by itself, "Sequence Header" (SH) is provided at the head of each set of video data in the VU. The reproduction time of the VU is defined by the multiplication of the number of video frames in the VU by the cycle of the video frames. To constitute one RU by an integral number of VUs, the ends of the respective VUs are set at 0 in order to cause the head and terminal of the RU to correspond to the ECC block border.

Method of Managing AV Stream

Figure 15:
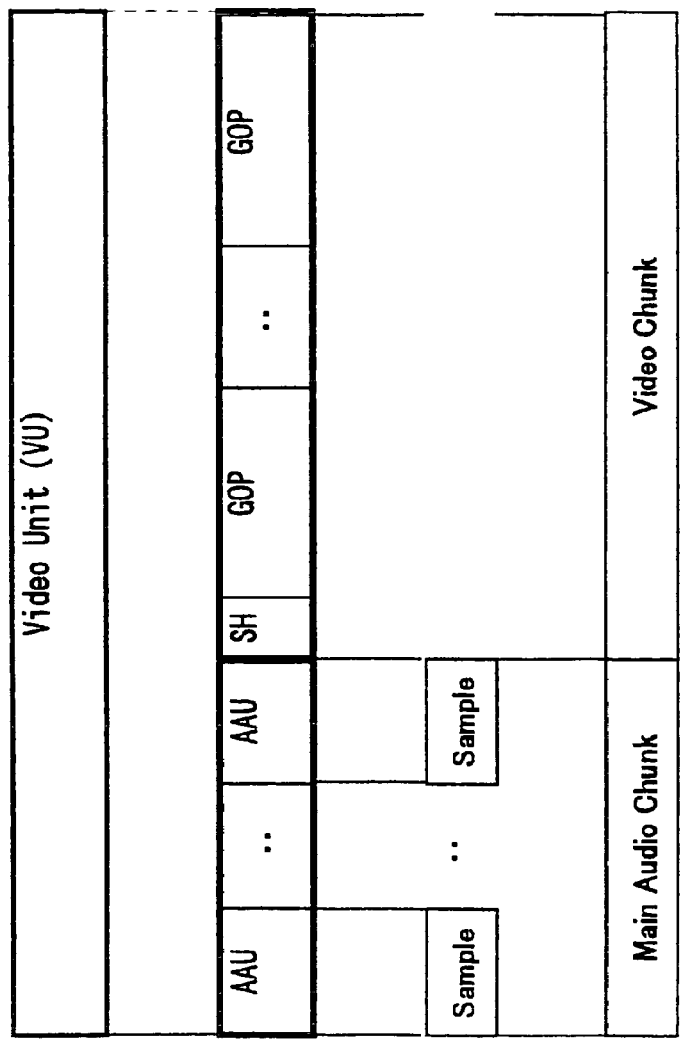
FIG. 15 illustrates how the AV stream is managed in the Quicktime.

A method of managing the AV stream is based on the above-mentioned Quicktime file format. FIG. 15 shows how the AV stream is managed. Video data and audio data are managed by a video track and an audio track, respectively. In the video track, the management is carried out in such a manner that one video frame is dealt with as one sample, and a series of GOPs in the VU is dealt with as one chunk. In the audio track, meanwhile, the management is carried out in such a manner that one AAU is dealt with as one sample and a series of AAUs in the VU is dealt with as one chunk.

Method of Determining RU

Next, how the RU is determined is discussed. According to this method, one device is assumed as a reference (i.e. a reference device model), and keeping this assumption in mind, a unit for sequential recording is determined in such a manner as not to interrupt the seamless reproduction.

Figure 16:
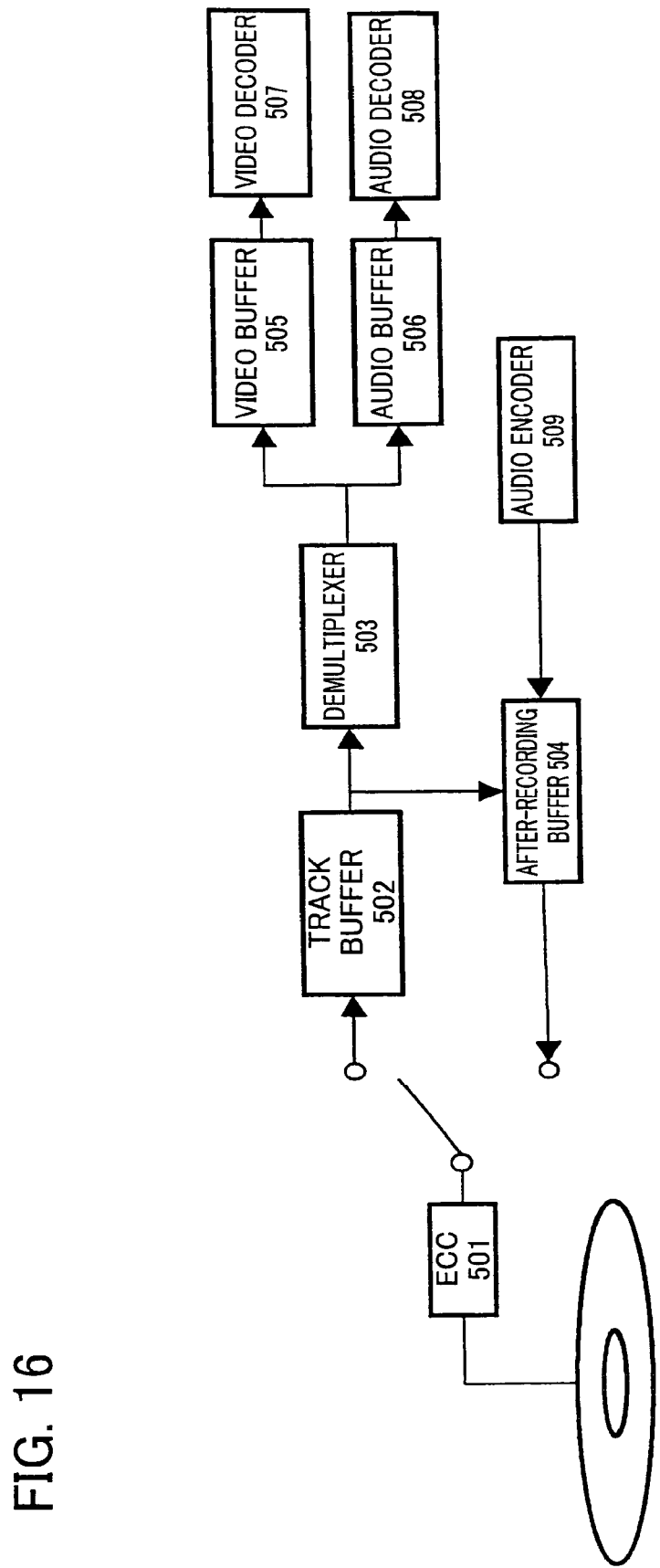
FIG. 16 illustrates a reference device model.

First, the reference device model is described with reference to FIG. 16. The reference device model is made up of: one pickup; ECC encoder and decoder 501 connected to the pickup; a track buffer 502; a demultiplexer 503; an after-recording buffer 504; an audio encoder 509; a video buffer 505; an audio buffer 506; a video decoder 507; and an audio decoder 508.

It is assumed here that the seamless reproduction in the present model is assured on condition that, at the start of decoding the VU, at least one VU exists on the track buffer 502. The speed of inputting audio frame data to the ECC encoder 501 and the speed of outputting the data from the ECC decoder 501 are both determined as Rs.

Moreover, the maximum period for pausing the reading and recording carried out by accessing is determined as Ta, and a period required for a short access (about 100 tracks) is determined as Tk. Note that, each of these periods includes a period for seeking, a period for waiting for the rotation, and a period from the access to the output of data which is initially read out from the disk, the data being outputted from the ECC. In the present embodiment, Rs=20 Mbps, Ta=1 second, and Tk=0.2 second.

When the reproduction is carried out using the above-described reference device model, it is possible to assure that there is no underflow of the track buffer 502, if the following condition is met.

Before describing the condition, the definitions of symbols are given as follows: The i-th successive field constituting the AV stream is C#i, and the reproduction time included in the C#i is Tc(i). Tc(i) is an aggregate of the reproduction times of the VUs whose heads are included in the C#i. Also, a period of time for accessing from the C#i to the C#i+1 is Ta.

Furthermore, a period of time of reading out VUs corresponding to the reproduction time Tc(i) is Tr(i). With these symbols in mind, the condition with which the underflow of the track buffer 502 does not occur is represented by the following formula for an arbitrary C#i, provided that the maximum reading time including the jumping between discrete sets of data is Tr(i).

$$Tc(i) \geq Tr(i) + Ta \qquad \text{<Formula 1>}$$

This is because, this formula is a sufficient condition to meet the following sufficient condition for the seamless reproduction.

$$\Sigma_i Tc(i) \geq \Sigma_i (Tr(i) + Ta)$$

Substituting Tr(i)=Tc(i)×(Rv+Ra)/Rs for Tr(i) in Formula 1 and solving the formula for Tc(i), the following condition of Tc(i), which can assure the seamless reproduction, is obtained.

$$Tc(i) \geq (Ta \times Rs)/(Rs - Rv - Ra) \qquad \text{<Formula 2>}$$

In other words, the seamless reproduction is assured if the aggregate of the VUs whose headers are included in the respective successive fields meets the formula above. On this occasion, it is possible to set a limitation in such a manner as to cause the respective successive fields include complete groups of VUs in which the total reproduction times meet the formula above.

In the automatically-divided movie file, it is also necessary to meet Formula 2. However, the first RU of the first automatically-divided movie and the last RU of the last automatically-divided movie do not necessarily meet Formula 2, because of the following reasons: The first RU can be compensated by causing the start of the reproduction to be later than the start of reading out data from the storage medium. Meanwhile, regarding the last RU, it is unnecessary to care about the successive reproduction as no data follows this RU. Loosening the conditions with regard to the first and last RUs, it is possible to effectively utilize free areas which are short.

Index File

Figure 17:
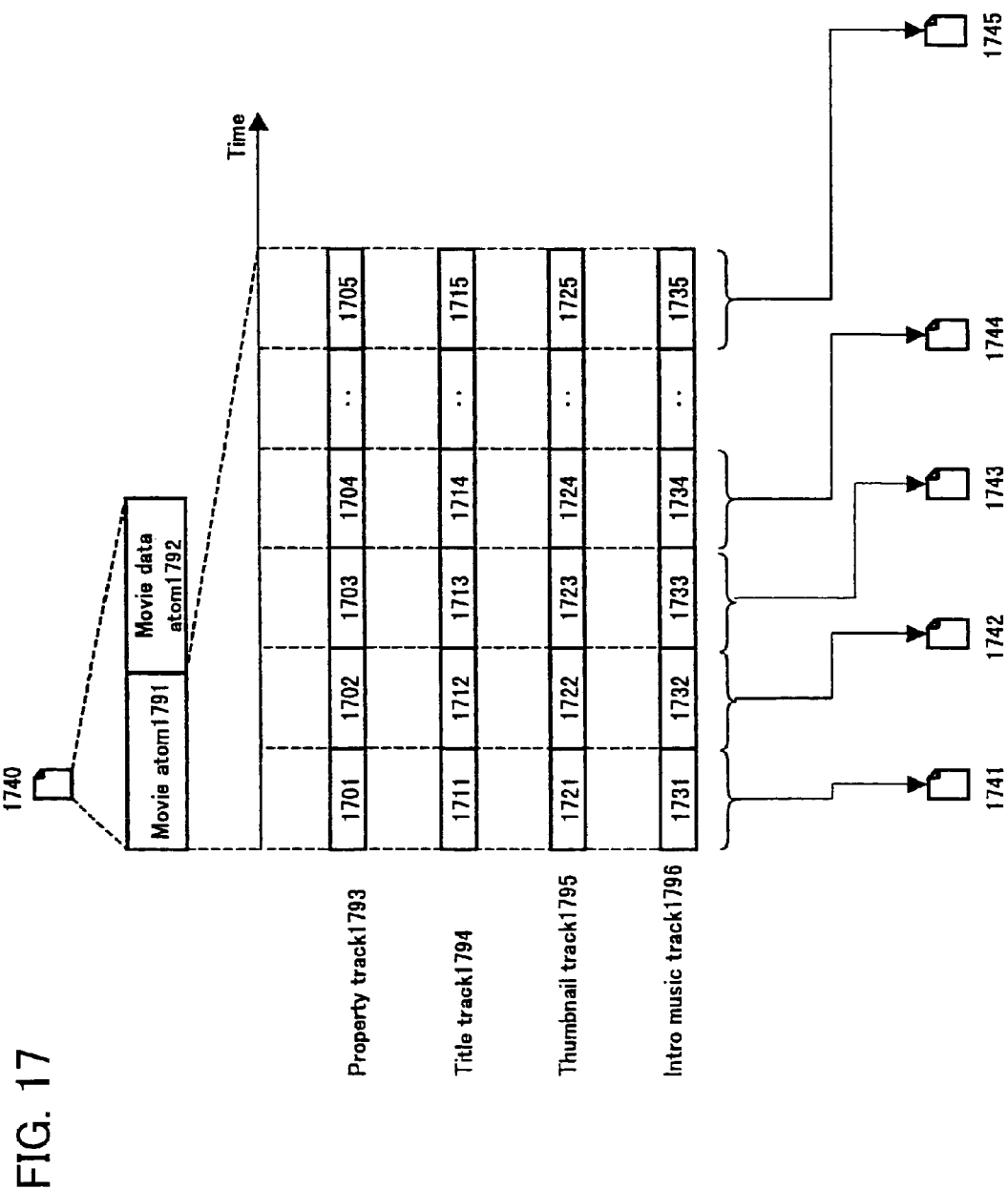
FIG. 17 illustrates a structure of an AV Index file.

To manage various types of files (hereinafter, Av files) in the optical disk 106, e.g. Quicktime movies and static image data, one special Quicktime movie file termed an AV Index file is provided in the disk. FIG. 17 shows this AV index file. Being identical with a usual Quicktime movie file, the AV index file is made up of a Movie atom 1791 which is management information and a Movie data atom 1792 which is actual data.

The AV Index file manages a plurality of entries. Each AV file in the disk is managed by a corresponding entry. Further, a folder in which the AV file is stored is also managed by a corresponding entry. In the present embodiment, files in the disk (optical disk 106) are managed by the AV Index file using entries. A table for managing the entries is thus stored in the AV Index file.

The Movie atom 1791 is made up of the following four tracks: a Property track 1793 for managing sets of attribute information of the respective entries; a Title track 1794 for managing sets of title character string data of the respective entries; a Thumbnail track 1795 for managing sets of representative image data of the respective entries; and an Intro music track 1796 for managing sets of representative audio data of the respective entries.

The sets of attribute information, title character string data, representative image data, and representative audio data regarding the respective entries are managed as samples in the respective tracks 1793 through 1795. Taking the AV file 1741 as an example, the attribute information is managed by the sample 1701 on the Property track 1793, the title character string data is managed by the sample 1711 on the Title track 1794, the representative image data is managed by the sample 1721 on the Thumbnail track 1795, and the representative audio data is managed by the sample 1731 on the Intro music track 1796. The samples are coordinated with each other in accordance with the reproduction start times of the respective samples. That is, it is determined that samples which are on different tracks but reproduced in an identical period correspond to the same entry.

In this manner, the Movie atom 1791 stores the attribute information, title character string data, representative image data, and representative audio data concerning each AV file. A set of the attribute information is structured as shown in FIG. 18. The fields are arranged as follows. "Version" indicates a version of the file format. "Pe-flags" is a collection of different types of flags, and will be described later.

"Parent-entry-number" stores an entry-number of an entry corresponding to a folder including an entry corresponding to the attribute information. "Entry-number" stores an entry number of the entry corresponding to the attribute information. These two sets of information indicate the inclusive relation between files and folders. Descriptions regarding "set-dependent-flags" and "user-private-flags" are omitted.

"Creation-time" indicates when the entry corresponding to the attribute information is generated (i.e. indicates the creation time), while "modification-time" indicates when the entry corresponding to the attribute information is modified. "Duration" indicates a reproduction time of the entry corresponding to the management information. When the entry corresponding to the attribute information corresponds to a file, the pathname of this file is encoded as "binary-file-identifier" in a fixed length. A detailed description of this binary-file-identifier is omitted.

"Referred-counter" records how many times a file managed by the entry corresponding to the attribute information is referred to by another file. That is, the referred-counter is equivalent to the information concerning the relationship with a file managed by another entry. "Referring file list" stores a list of pathnames of files that are actually referred to. "URL file identifier" stores, when the managed file cannot be encoded as the binary-file-identifier, the path of the file in the URL (Unified Resource Locator) format.

Other types of data stored in the Movie atom 1791 are now discussed. The representative image data is JPEG-reduced images each having the size of 160×120 pixels, the title string data is text data, and the representative audio data is data compressed under MPEG-1 Audio Layer-II.

First Embodiment

The following will describe First Embodiment of the present invention with reference to FIGS. 19 through 24. In the present embodiment, the attribute information of the AV Index file is caused to include a flag for identifying an automatically-divided movie file. Based on this, image reproductions and deletion of files are properly carried out, thereby preventing the user from being perplexed.

Management Information Format

The formats of the Quicktime movie file and the AV Index file have been described above. The pe-flags field of the attribute information (FIG. 18) of the AV Index file is defined as shown in FIG. 19. Respective fields therein are discussed below. "Attribute of Entry" records the type of a layer to which an entry corresponding to the Property entry belongs. Regarding the layer, no further description is given here.

"Type of Entry" stores information for telling whether the corresponding entry is a file or a folder. No descriptions are given here to "Usage of Entry" and "Status of Entry". "Data reference of corresponding AV file" is a flag for, when the corresponding entry manages an AV file, identifying whether or not the entry refers to another AV file.

"Structural status of corresponding AV file" is a flag for identifying whether or not the corresponding entry is an automatically-divided movie file, and is set to 1 when the entry is an automatically-divided movie file. "Security status of corresponding AV file" is a flag for, when the corresponding entry manages an AV file, identifying whether or not the entry is encrypted.

"Content type of corresponding AV file" is a field for storing, when the corresponding entry manages an AV file, the type of contents included in that file. In this manner, in the present embodiment, the referred-counter in the attribute information of the Movie atom in the AV Index file counts how many times the file managed by the corresponding entry is referred to by another file. Further, the Structural status flag of corresponding AV File of the pe-flags in the attribute information of the Movie atom in the AV Index file identifies whether or not the corresponding entry is an automatically-divided movie file. In the following, how the attribute information including these fields is used is described.

Steps for Recording

Figure 20:
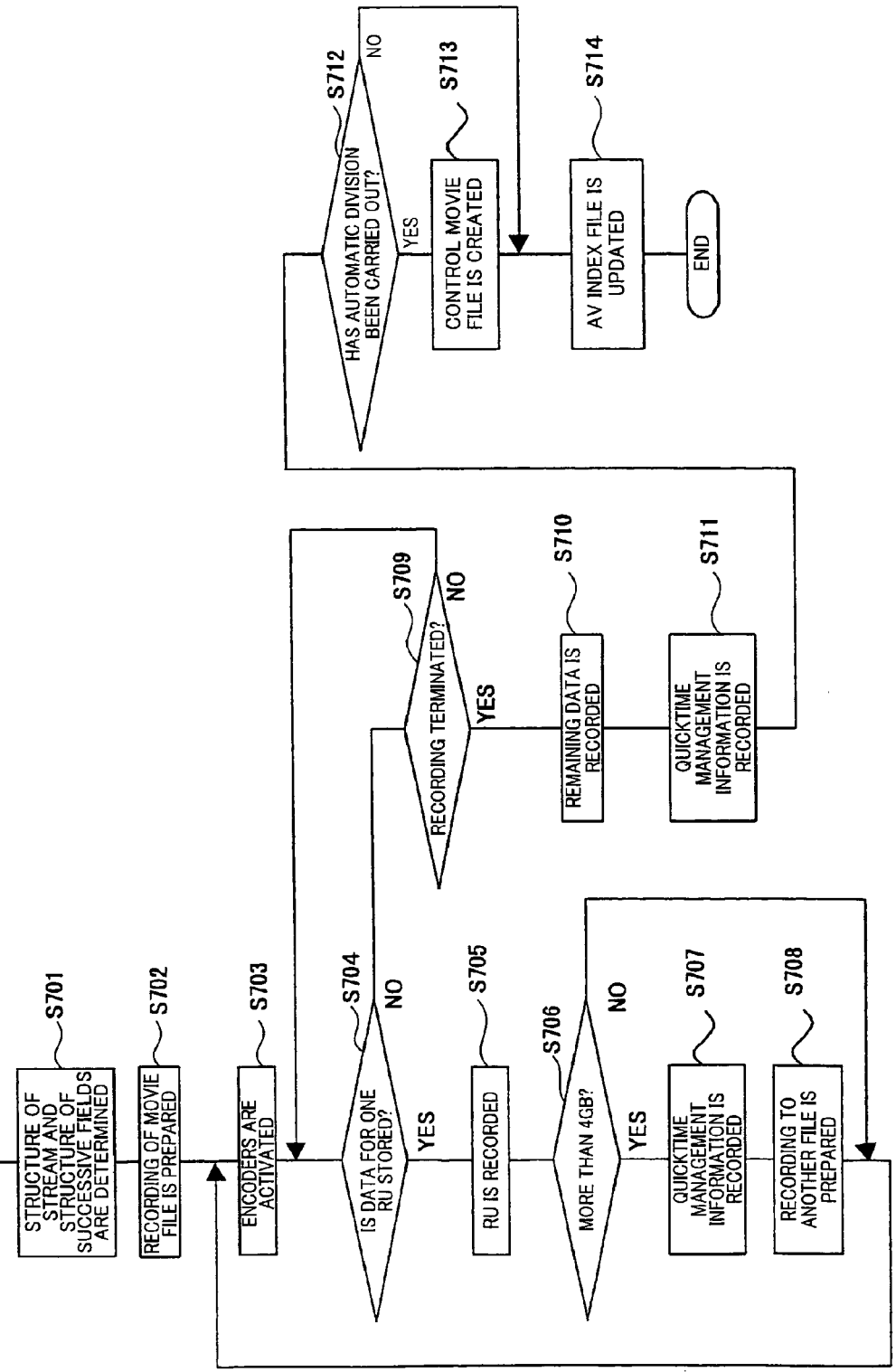
FIG. 20 is a flowchart of a recording operation.

Referring to FIG. 20, steps carried out when the user instructs recording are discussed. The AV stream to be recorded has a video bit rate Rv of 5 Mbps, audio sampling frequency of 48 kHz, and the bit rate Ra of 256 kbps. It is assumed that the management information of the file system has been read by the RAM 102.

First, the structure of the stream and the structure of the successive fields are determined (Step S701). Provided that one VU is 1GOP=30 frames, Rs=20 Mbps, Ta=1 second, and Ra=256 kbps are substituted into Formula 2, and the range of the Tc(i) which is not less than 1.36 seconds is acquired. Since the reproduction time of one VU is 0.5 second, the reproduction time of the RUs is 2 seconds.

Next, the recording of the movie file is prepared (S702). More specifically, the file is opened and a free area which can successively record one RU is searched. If no such free area, the recording is interrupted and the user is informed that the recording cannot be carried out.

Also, the audio encoder 117 and the video encoder 118 are activated (S703). Then whether or not the recording buffer 111 stores data for one RU is checked (S704).

If the data is stored, the data for one RU in the recording buffer 111 is successively recorded to the optical disk 106 (S705). Then the size of the file being currently recorded is checked (S706). If the file size may exceed 4 GB after the recording of the next RU, the management information of the movie file that is currently recorded is recorded (S707), and the recording of a new movie file is prepared to allow the subsequent data to be recorded to another movie file (S708). After S708, the process goes back to S703 in order to record the data for the next one RU. even if the file size does not exceed 4 GB after the recording of the next RU, the process goes back to S703.

If data for 1RU has not stored in S704, the presence of an instruction to terminate the recording is checked (S709). S704 is carried out if the instruction has not been made, while the following recording termination process is carried out if the instruction has been made. In the process, first, the remaining data is recorded to the movie file which is currently engaging in the recording (S710), and the management information is recorded (S711).

Next, whether or not the automatic division has been carried out is checked (S712). If the automatic division has been done, a control movie file is generated (S713). Finally, the Quicktime movie file thus generated is registered to the AV Index file (S714). When the automatic division has been done, the automatically-divided movie file and a control file are registered. If the automatic division has not been done, one Quicktime movie file is registered. The process also goes to S714 also when the automatic division has not been done in S712.

Figure 21:
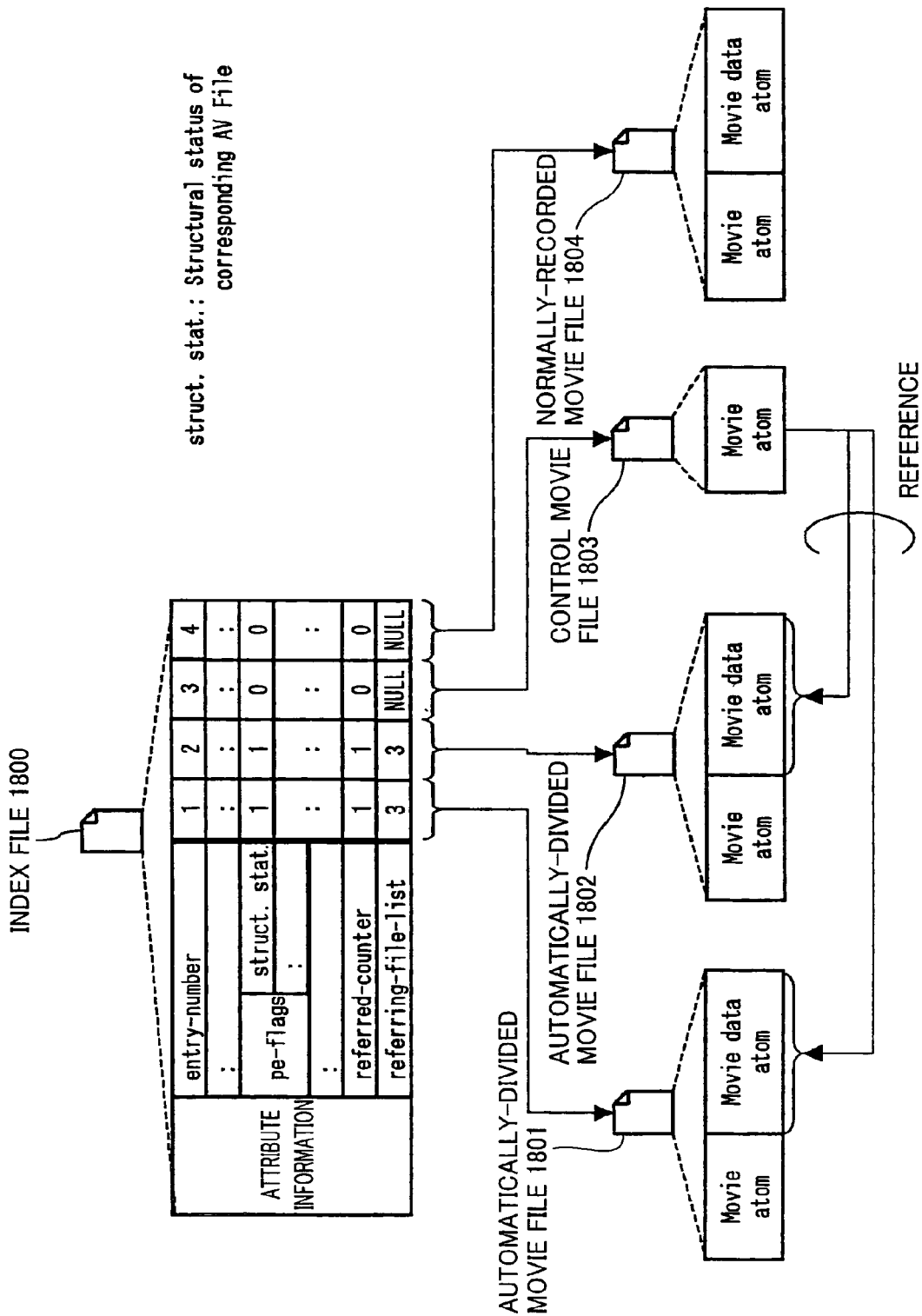
FIG. 21 illustrates the attribute information after the recording in First Embodiment of the present invention.

Referring to FIG. 21, the following will describe how the attribute information to be registered to the AV Index file 1800 is set. First, a case where the attribute information is automatically divided and recorded as automatically-divided movie files 1801 and 1802 and a control movie file 1803 is discussed. Note that, the automatically-divided movie files 1801 and 1802 correspond to divided data and the control movie file 1803 corresponds to control data referring to the divided data.

Since the automatically-divided movie files 1801 and 1802 have automatically been divided, the Structural status of corresponding AV File of the pe-flags is set to 1 (auto-divided). Also, being referred to by the control movie file 1803, the referred-counter of the attribute information entry is set to 1. The referring-file-list is set to 3 which is the entry-number of the control movie file 1803.

Meanwhile, as the control movie file 1803 is not referred to by another file, the referred-counter is set to 0. Not being automatically divided, the Structural status of corresponding AV File of the pe-flags is set to 0.

Next, a normally-recorded movie file 1804 which is recorded without the automatic division is discussed. Since this normally-recorded movie file 1804 is not referred to by another file, the referred-counter is set to 0. Also, as the automatic division is not carried out, the Structural status of corresponding AV File of the pe-flags is set to 0.

Steps for Nondestructive Editing

A method of managing the AV Index file when the nondestructive editing is carried out will be discussed with reference to FIG. 22. First, a case where a Quicktime movie not being automatic-divided is subjected to the nondestructive editing is described. Assume the following: in the AV Index file 1800, the normally-recorded movie file 1804 is registered, and a nondestructive-edited movie file 1805 is generated with partly reference to the normally-recorded movie file 1804.

In this case, since a value included in the attribute information entry of the normal movie file 1804 registered in the AV Index file 1800 is referred to by the nondestructive-edited movie file 1805, the referred-counter is set to 0. To the referring-file-list, the entry-number of the nondestructive-edited movie file 1805, i.e. 5 is recorded.

Not being automatically divided, the Structural status of corresponding AV File of the pe-flags is set to 0. Meanwhile, since a value in the attribute information entry of the nondestructive-edited movie file 1805 is not referred to by another file, the referred-counter is set to 0. Furthermore, not being automatically divided, the Structural status of corresponding AV File of the pe-flags is set to 0.

Next, a case where a Quicktime movie having been automatically divided is subjected to the nondestructive editing is discussed. Assume that a nondestructive-edited movie file 1806 which refers to a part of a Quicktime movie which is recorded after being automatically divided into automatically-divided movie files 1801 and 1802 and a control movie file 1803 is generated.

In this case, the values in the attribute information entries of the respective automatically-divided movie files 1801 and 1802 are referred to by the control movie file 1803 and the nondestructive-edited movie file 1806. Thus, the referred-counter is set to 2. The referring-file-list records 3 and 6 which are the entry-numbers of the control movie file 1803 and the nondestructive-edited movie file 1806, respectively.

Also, being automatically divided, the Structural status of corresponding AV File of the pe-flags is set to 1. Since the values in the attribute information entries of the control movie file 1803 and the nondestructive-edited movie files 1805 and 1806 are not referred to by another file, the referred-counter is set to 0. Furthermore, not being automatically divided, the Structural status of corresponding AV File of the pe-flags is set to 0.

Steps for Showing Contents Selection Display

To the user, thumbnail images corresponding to the attribute information entries in which the Structural status of corresponding AV Files of the pe-flags are set to 0 are displayed. In a case shown in FIG. 22, thumbnail images corresponding to the entry-numbers 3, 4, 5, and 6 are displayed. In this manner, whether or not thumbnail images are shown on the contents selection display may be determined in accordance with a flag (information regarding whether or not the divisional recording has been done) which identifies whether or not, for instance, the corresponding entry among the attribute information entries of the movie data is an automatically-divided movie file. From the thumbnail images on the contents selection display, the user can select a thumbnail image corresponding to a desired file, and reproduce or erase the file.

Steps for Erasure

Either one of the following two types of operation guidelines can be exercised when the user instructs the erasure through the contents selection display.

(Operation Guideline 1) An AV file generated through the nondestructive editing is determined as erasable, while an AV file generated through other ways is determined as erasable, on condition that that AV file is not referred to by a nondestructive editing movie. Note that, if the automatically-divided movie file is referred to by a nondestructive editing movie, the control movie file controlling that automatically-divided movie file is also treated as being referred to by the same nondestructive editing movie file.

(Operation Guideline 2) An AV file not being referred to by another AV file is determined as erasable.

The operation guideline 1 is based on such an idea that the original (initially recorded) data recorded by the user is differentiated from the results of editing which are derived from the original data, in order to conserve the original data as much as possible. Meanwhile, the operation guideline 2 is based on such an idea to prevent the erasure of one AV file from influencing on other AV files.

The original data in this case indicates, for instance, a recorded image/audio data which has not been edited. On the other hand, non-original data is an AV file after being subjected to the editing. Thus, for instance, a file being subjected to the nondestructive editing is non-original data.

When accessing data using the file system, for instance, a file of original data is expressed as an original file, and an entry of the original file is expressed as an original entry.

The following will describe the steps carried out for implementing these operation guidelines.

Steps for Erasure (Based on Operation Guideline 1)

Figure 22:
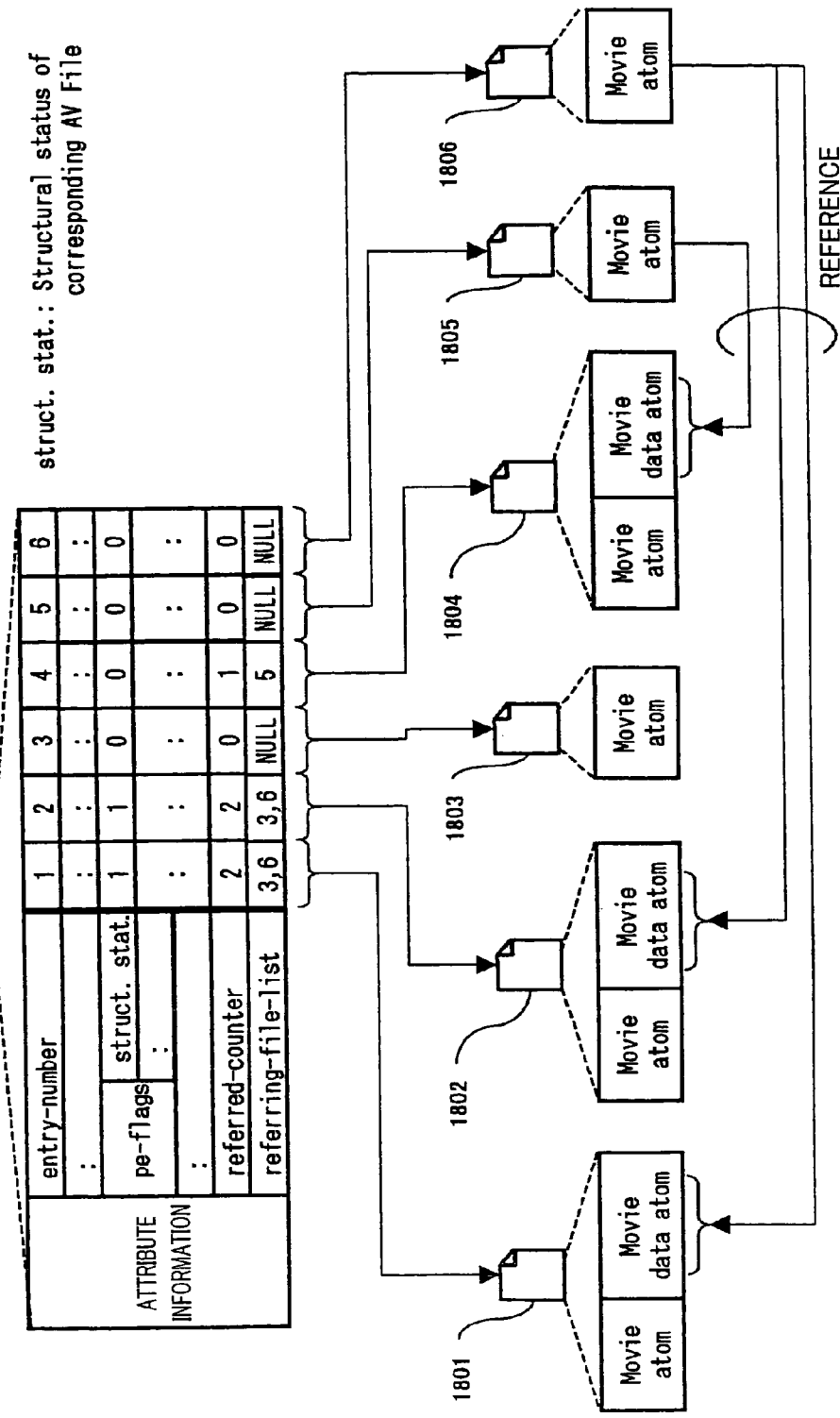
FIG. 22 illustrates the attribute information after nondestructive editing in First Embodiment of the present invention.

In FIG. 22, the entries with the entry-numbers 5 and 6 correspond to movies generated as a result of nondestructive editing, and the entries with the entry-numbers 3 and 4 are sets of original data to which the respective movies with the entry-numbers 5 and 6 refer. Thus, when the user designates the entries with the entry-numbers 5 and 6 as the targets of erasure, these entries are erased. In the meantime, when the user designates the entries with the entry-numbers 3 and 4 as the targets of erasure, the erasure is refused or a warning is given to the user.

Figure 23:
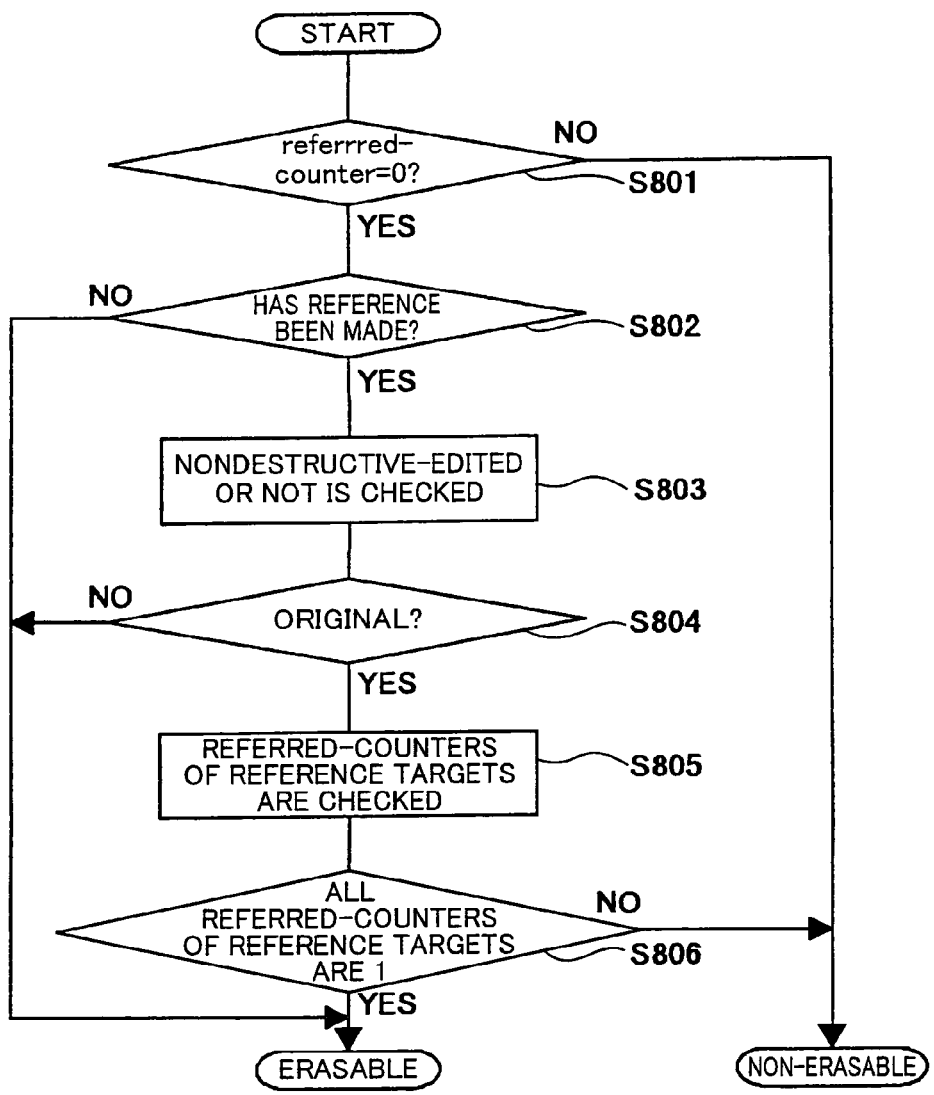
FIG. 23 is a flowchart of an operation to determine whether or not a file is erasable in First Embodiment of the present invention.

Referring to FIG. 23, a process of determining erasability is discussed. First, to check whether or not the AV file corresponding to the designated entry is referred to by another AV file, the referred-counter of the designated entry is examined. When the referred-counter is 1 or more, it is determined that the AV file is referred to by another AV file and thus cannot be erased (S801). In the example shown in FIG. 22, the referred-counter of the movie file 1804 is 1 and thus cannot be erased. When the referred-counter is 0, the process goes to S802.

Next, whether or not the AV file corresponding to the designated entry externally refers to another AV file is checked. When no file is referred, it is determined that the erasure can be carried out (S802). Whether or not the AV file externally refers to another AV file can be checked by examining the Data reference of corresponding AV File. Alternatively, the external reference can be checked by examining whether or not the referring-file-list of another entry includes the entry-number of the designated entry.

Then whether or not the designated AV file is a movie generated as a result of nondestructive editing is checked (S803). The steps for achieving this is discussed with reference to a flowchart in FIG. 24. First, all entries having the referring-file-lists including the entry-number of the designated entry are listed, and the values of the Structural status of corresponding AV File of the respective listed entries are examined (S901). In this manner, whether or not each of these entries is recorded in a divided manner (i.e. automatically divided) is checked.

If none of these values is 1 (automatically-divided), it is determined that the designated AV file is a movie generated as a result of nondestructive editing (S902). If all of the values are 1, whether the next file corresponding to the entry is a control movie file or a nondestructive editing movie file is identified. More specifically, the referred-counters of the respective entries being listed are examined (S903). If none of these entries is 2 or more, the type of the file is determined as a control movie file, i.e. an original file (S904). In other words, it is determined that the file is not a movie file generated as a result of nondestructive editing. In this manner, the determination is carried out in accordance with the referred-counters which are information regarding the relationship with the data managed by other entries.

If at least one of the referred-counters is 2 or more in S904, the creation-time of the file corresponding to the entry in which the referred-counter is 2 or more is compared with the creation-times of entries corresponding to other files referring to that file corresponding to the entry in which the referred-counter is 2 or more. If the creation-time of the file corresponding to the entry in which the referred-counter is 2 or more is the earliest, the file is identified as a control movie file (original file). Else, the file is identified as a nondestructive editing movie file (S905).

When, for instance, the above-described steps are carried out with respect to the control movie file 1803, the steps S901, S902, S903, and S904 are carried out, and in S905, the creation-time of the control movie file 1803 is compared with the creation-time of another movie file 1806. As a result, the control movie file 1803 is identified as an original file. As to the movie files 1805 and 1806, these steps reveal that these files are determined as nondestructive editing movie files.

Note that, although in the present case the creation-time in the attribute information entry is used as a criterion for judgment, a duration may be used instead of the creation-time. More specifically, the file is identified as a control movie file if the total durations of the AV files being referred to are identical with the duration of the designated movie. In other words, the file is identified as not being a movie file generated as a result of the nondestructive editing. If not, the file is identified as a nondestructive editing movie file.

Now, a further description is given with reference again to FIG. 23. If the AV file corresponding to the designated entry is non-original, the file is determined as erasable (S804). If the AV file is original, the process goes to the next step S805. Subsequently, the referred-counters of the AV files to which the AV file of the designated entry refers to are checked (S805). The erasure is allowed if all of these referred-counters are 1. Else, the erasure is not allowed (S806).

Now, how the steps after the erasure is allowed and actually carried out are described. If what has been erased was a control movie file, not only that control movie file but also automatically-divided movie files to which that control movie file referred are erased.

If, meanwhile, what has been erased was a nondestructive editing movie file, in addition to the erasure of that file, the referred-counter of the entry corresponding to the AV file to which the erased file referred to is reduced by 1, and from the referring-file-list, the entry-number of the entry corresponding to that erased file is deleted. If what has been erased was other than the above, no further actions have to be taken other than the erasure of the file. Note that, the entry of the AV Index file corresponding to the erased AV file is of course deleted.

In this manner, in the steps S803 and S804, whether or not an entry is erasable is determined by checking whether or not that entry is original, and the erasure is carried out accordingly. Thus, the erasure can be carried out without making the user feel uncomfortable, even of an automatically-divided movie file exists.

In the arrangement above, as described with reference to FIG. 23, whether or not a file is original (i.e. whether or not the file is initially-recorded data) is determined in S804. The file being identified as original is determined as erasable if all of the referred-counters of the files to which the original file refers to are 1, while the original file is determined as non-erasable when at least one of the referred-counters of the files to which the original file refers to is not 1.

Thus, when whether or not the control movie file 1803 shown in FIG. 22 is erasable is determined, one of the referred-counters of the files 1801 and 1802 to which the file 1803 refers is not 1, and are referred to by another movie file 1806, so that the file 1803 is determined as non-erasable.

Meanwhile, when whether or not the control movie file 1803 in FIG. 21 is erasable is determined, the referred-counters of the files 1801 and 1802 which are the targets of the reference are both 1, so that the file 1803 is determined as erasable. On the occasion of erasing this file 1803, the files 1801 and 1802 being referred to are also erased.

In this manner, even if an automatically-divided movie file exists, the file is erased only when the automatically-divided movie file is referred to only by a control movie file and not by other files. Thus, the erasure is carried out without making the user feel uncomfortable. Furthermore, reference movies (automatically-divided movie and control movie) are managed without making the user feel be puzzled.

Furthermore, as described with reference to FIG. 24, in the steps S901 through S905, whether or not a registered entry is original is determined with reference to the information regarding the divisional recording, the information regarding the relationship with data managed by another entry, and the creation-time. This ensures correct determination as to whether or not the entry is original.

Steps for Erasure (Based on Operation Guideline 2)

In the example shown in FIG. 22, the referred-counters of the entries whose entry-numbers are 3, 5, and 6 are 0, so that it can be determined that these entries are not referred to by an AV file corresponding to another entry. Thus, when the user designates these entries whose entry-numbers are 3, 5, and 6 as targets of erasure, these entries are erased. Meanwhile, when the user designates an entry whose entry-number is 4 as a target of erasure, the erasure is rejected or a warning is given to the user.

The erasure in reality is carried out in the following manner: First, the referred-counter of the entry corresponding to the AV file to which the file designated to be erased refers is reduced by 1, and the entry number of the entry corresponding to that AV file is deleted from the referring-file-list. If the referred-counter is reduced to 0, that AV file is erased. At the end, the AV file designated to be erased is erased. Note that the entry of the AV Index file corresponding to the erased AV file is also erased as a matter of course.

Second Embodiment

Figure 27:
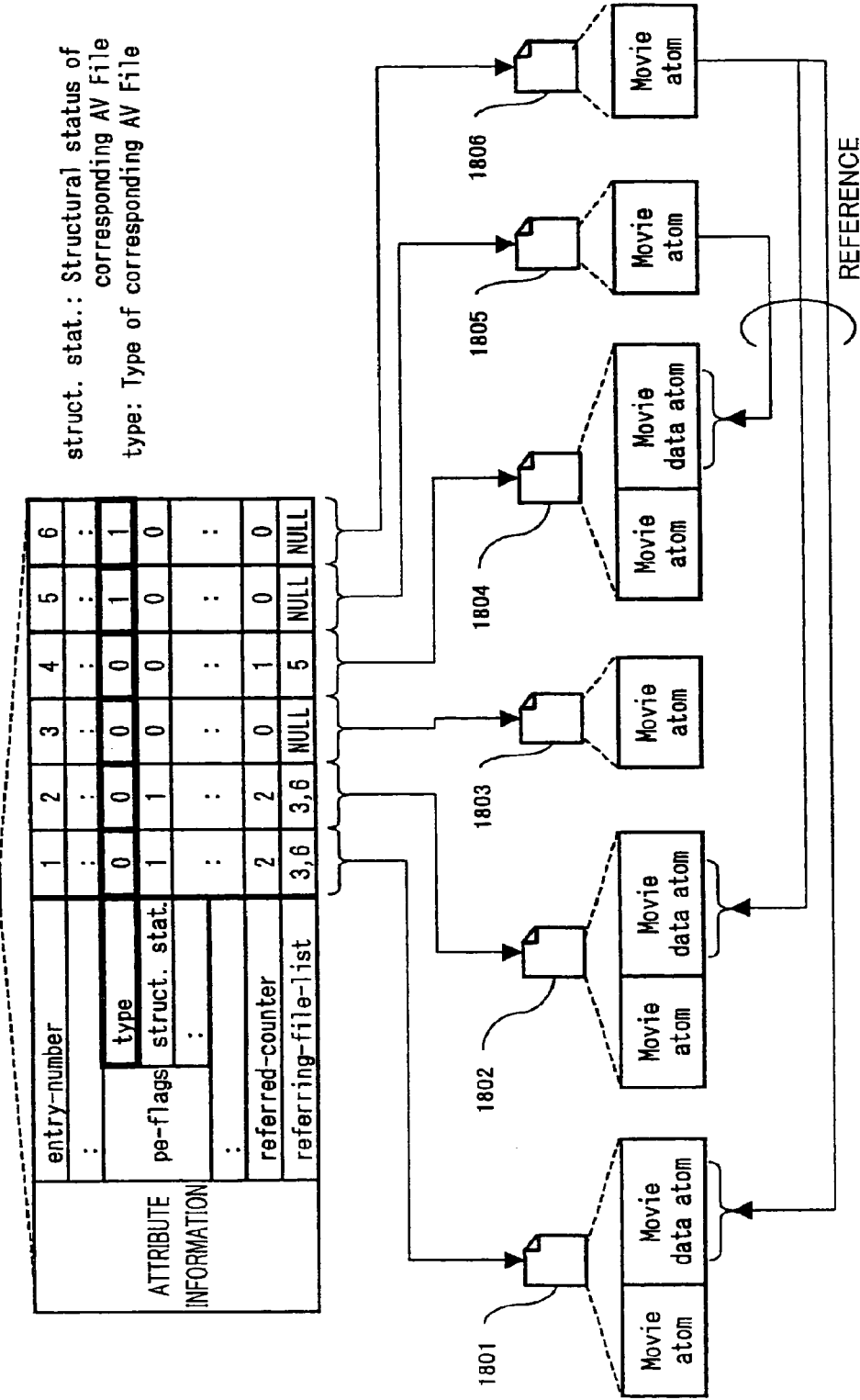
FIG. 27 illustrates the attribute information after nondestructive editing in Second Embodiment of the present invention.

The following will discuss Second Embodiment of the present invention with reference to FIGS. 25-27. In this embodiment, a flag for telling whether or not attribute information of an AV Index file is initially-recorded data is included in the attribute information of the V Index file, in addition to the flag for telling whether or not the attribute information is an automatically-divided movie file. Based on this, image reproductions and deletion of files are properly carried out, thereby preventing the user from being confused. Second Embodiment can resolve the below-mentioned problem, which is raised when a built-in clock of the recording device is not accurate. As First Embodiment and the present embodiment have many features in common, the descriptions are given only to those different from the above.

Management Information Format

The formats of a Quicktime movie file and an AV Index file have already been described above. In the present embodiment, a pe-flags field in a Property entry of an AV Index file is defined as shown in FIG. 25. The pe-flags includes, for instance, a Structural status of corresponding AV File flag. This arrangement is identical with that in First Embodiment, except that a flag for telling whether the AV file corresponding to the entry is original or is generated by editing, termed "Type of corresponding AV File", is added. When the value of this Type of corresponding AV File is 0, the AV file is identified as an original (not edited) AV file. When the value of the Type of corresponding AV File is 1, it is identified that the AV file is an AV file generated by editing. In other words, The Type of corresponding AV File flag is equivalent to information for identifying whether or not the data managed by the entry is initially-recorded data.

A description of this flag is given. In First Embodiment, a distinction is made as to whether the file is an original file or a nondestructive editing file, on the occasion of carrying out the erasure, as shown in FIG. 23. Note that, the original file in this case is an initially-recorded file of an image taken by the user. On this occasion, the distinction is made based on the creation-times as shown in FIG. 24. However, this may not be correctly carried out if a built-in clock of the recording device is not accurate. Using the above-mentioned flag makes it possible to make a distinction as to whether the file is an original file or a nondestructive editing file, without relying on such a built-in clock. The present embodiment is also identical with First Embodiment to the point where the number of times a file managed by the corresponding entry is referred to by another file is indicated in the referred-counter of attribute information of the Movie atom of the AV Index file.

Steps for Recording

Descriptions regarding the steps carried out when the user instructs recording are not given as being basically identical with those of First Embodiment. It is noted that, however, in the present embodiment, as shown in FIG. 26, the Type of corresponding AV File added to the attribute information entry of the AV Index file is set to 0.

Steps for Nondestructive Editing

A method of managing the AV Index file on the occasion of carrying out the nondestructive editing is basically identical with that in First Embodiment, so that the descriptions thereof are omitted. It is noted that, however, in the present embodiment, as shown in FIG. 27, the Type of corresponding AV File flags in the attribute information of the AV Index file, the flags corresponding to nondestructive-edited movie files 1805 and 1806, are set to 0.

Steps for Showing Contents Selection Display

To the user, thumbnail images corresponding to the attribute information entries in which the Structural status of corresponding AV Files of the pe-flags are set to 0 are displayed. In the example shown in FIG. 27, thumbnail images corresponding to the entry-numbers 3, 4, 5, and 6 are displayed.

Steps for Erasure

As in First Embodiment, either Operation Guideline 1 or Operation Guideline 2 can be exercised when the user instructs the erasure through the contents selection display. The following will discuss the steps for exercising these operation guidelines.

Steps for Erasure (Based on Operation Guideline 1)

Figure 24:
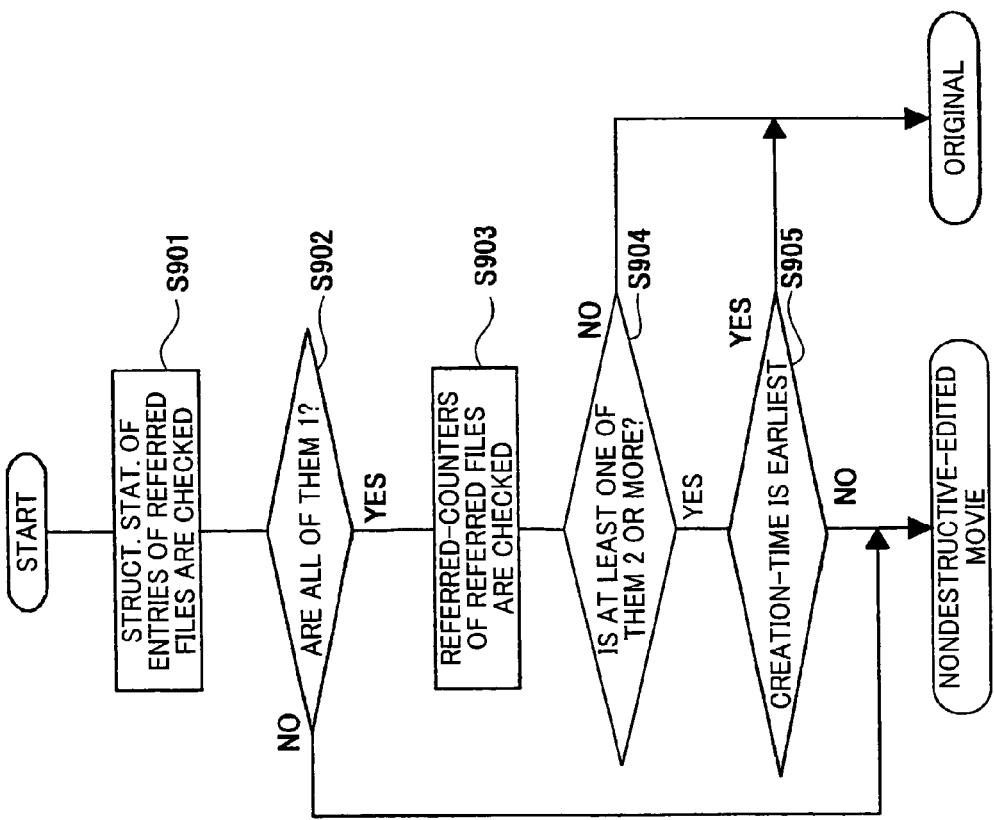
FIG. 24 is a flowchart of an operation to tell whether a file is an original file or a nondestructive-edited file in First Embodiment of the present invention.

The steps carried out when the user instructs the erasure through the contents selection display are basically identical with those described in First Embodiment with reference to FIGS. 23 and 24. However, in the present embodiment, in the step S803 shown in FIG. 23, whether the AV File corresponding to the designated entry is generated through the nondestructive editing or is original is determined in such a manner that, the AV File is judged as the product of the nondestructive editing when the Type of corresponding AV File of the pe-flags of the designated entry is 1, while the AV File is judged as original when the Type of corresponding AV File of the pe-flags of the designated entry is 0. To this extent, the steps for the erasure in the present embodiment are different from those in First Embodiment.

As described above, the present embodiment is arranged such that whether or not the AV Index file is original is determined with reference to the Type of corresponding AV File flag in the AV Index file. This flag is generated on the occasion of creating a file by recording, nondestructive editing and the like. For this reason, this makes it possible to surely determine whether or not the file is original.

In First Embodiment, the distinction is made based on the creation-time so that an error may occur if a built-in clock of the recording device is not accurate. On the other hand, the present embodiment has such an advantage that the process is correctly carried out irrespective of the accuracy of the built-in clock.

As in First Embodiment, even if an automatically-divided movie file exists, the file is erased only when the automatically-divided movie file is referred to only by a control movie file and not by other files. Thus, the erasure is carried out without making the user feel uncomfortable. Furthermore, reference movies (automatically-divided movie and control movie) are managed without making the user feel be puzzled.

Steps for Erasure (Based on Operation Guideline 2)

The steps for erasure based on Operation Guideline 2 are identical with those in First Embodiment. That is to say, in an example shown in FIG. 27, the referred-counters of the entries whose entry-numbers are 3, 5, and 6 are set to 0, indicating that these entries are not referred to by an AV file corresponding to another entry. Thus, when the user designates these entries whose entry-numbers are 3, 5, and 6 as targets of erasure, these entries are erased. Meanwhile, when the user designates an entry whose entry-number is 4 as a target of erasure, the erasure is rejected or a warning is given to the user.

The erasure in reality is carried out in the following manner: First, the referred-counter of the entry corresponding to the AV file to which the file designated to be erased refers is reduced by 1, and the entry number of the entry corresponding to that AV file is deleted from the referring-file-list. If the referred-counter is reduced to 0, that AV file is erased. At the end, the AV file designated to be erased is erased. Note that the entry of the AV Index file corresponding to the erased AV file is also erased as a matter of course.

Third Embodiment

The following will describe Third Embodiment of the present invention with reference to FIGS. 28-32. In the present embodiment, a flag for determining whether or not data is presented to the user is included in the attribute information of the AV Index file, in addition to the flag for telling whether or not attribute information is initially-recorded data and the flag for telling whether or not the attribute information is an automatically-divided movie file. Based on this, image reproductions and deletion of files are properly carried out, thereby preventing the user from being confused. As First and Second Embodiments and the present embodiment have many features in common, the descriptions are given only to those different from the above.

Management Information Format

The formats of a Quicktime movie file and an AV Index file have already been described above. In the present embodiment, a pe-flags field in a Property entry of an AV Index file is defined as shown in FIG. 28. The pe-flags includes, for instance, a Structural status of corresponding AV File flag and a Type of corresponding AV File flag. This arrangement is substantially identical with that in Second Embodiment, except that a flag called a Visual Status of Type of corresponding AV File indicating whether or not the entry is presented to the user by, for instance, the contents selection display is added (the flag is 0 when the entry is presented to the user, while the flag is 1 when the entry is not presented to the user). This Visual Status of Type of corresponding AV File flag is equivalent to information for deciding whether or not data managed by an entry is presented to the user.

The addition of this field makes it possible to select an alternative operation guideline for the erasure as discussed below, in addition to the operation guidelines for the erasure described in First and Second Embodiment.

Note that, the present embodiment is also identical with the embodiments above to the point where the number of times a file managed by the corresponding entry is referred to by another file is indicated in the referred-counter of attribute information of the Movie atom of the AV Index file.

Steps for Recording

Descriptions regarding the steps carried out when the user instructs recording are not given as being basically identical with those of the foregoing embodiments. It is noted that, however, in the present embodiment, as shown in FIG. 29, Visual status of corresponding AV File flags added to the attribute information entries of the AV Index file are set to 1 for automatically-divided movie files 1801 and 1802, and are set to 0 for a control movie file 1803 and a normal movie file 1804.

Steps for Nondestructive Editing

A method of managing the AV Index file on the occasion of carrying out the nondestructive editing is basically identical with that in Second Embodiment, so that the descriptions thereof are omitted. It is noted that, however, in the present embodiment, as shown in FIG. 30, Visual Status of corresponding AV File flags in the attribute information entries of the AV Index file, the entries corresponding to nondestructive-edited movies 1805 and 1806, are set to 0.

Steps for After-Recording

Figure 31:
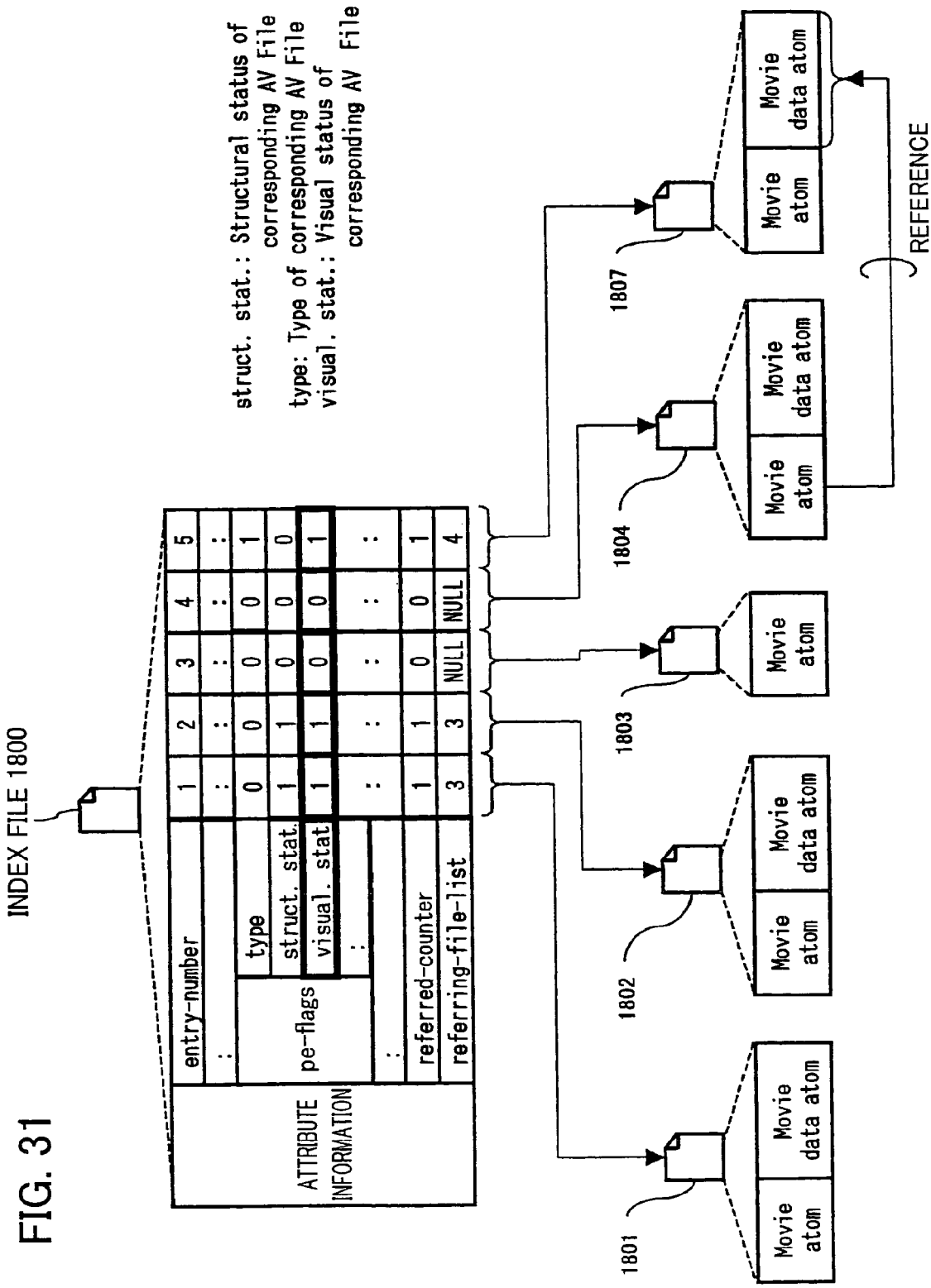
FIG. 31 illustrates attribute information after after-recording in Third Embodiment of the present invention.
Figure 32:
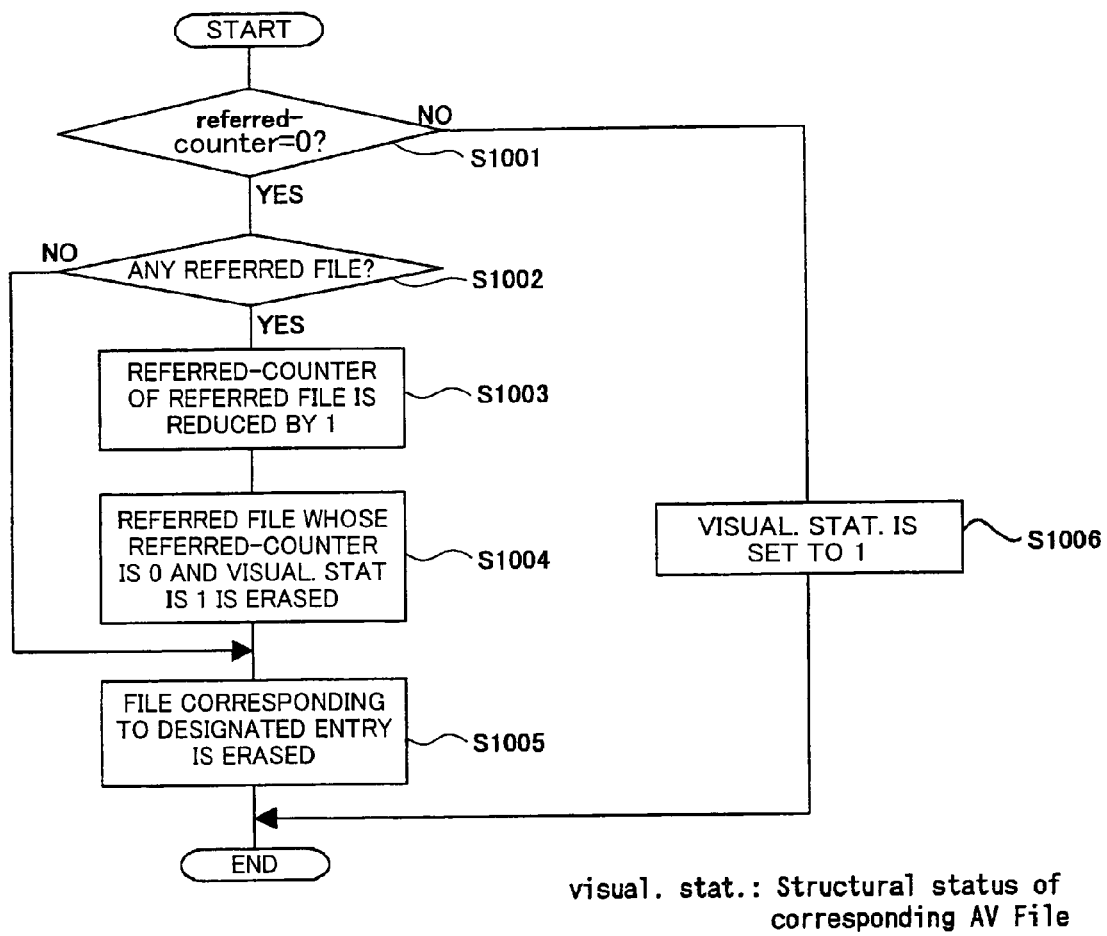
FIG. 32 is a flowchart of an erasing operation in Third Embodiment of the present invention.
Figure 33:
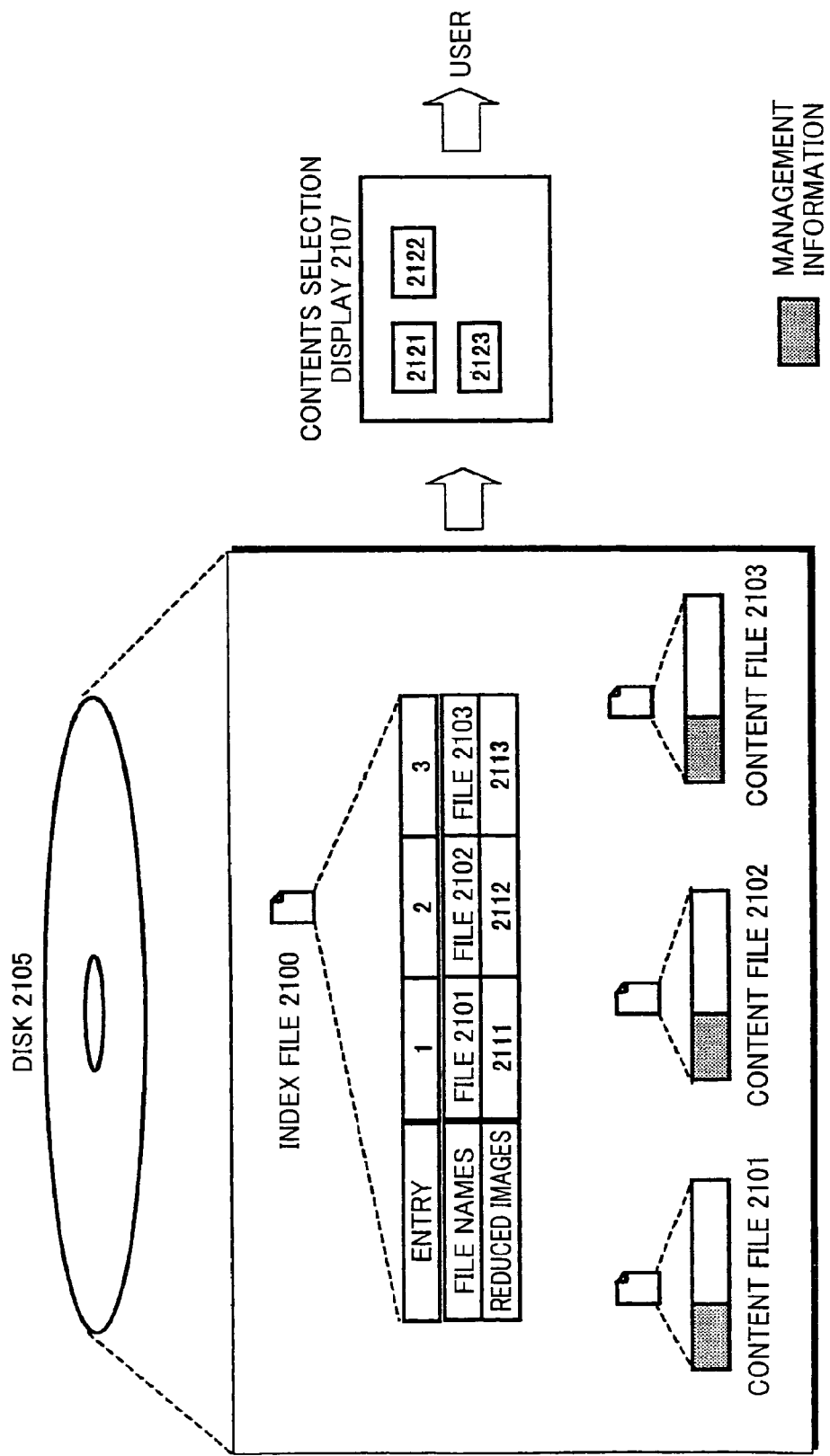
FIG. 33 illustrates an index file of a conventional art.
Figure 34:
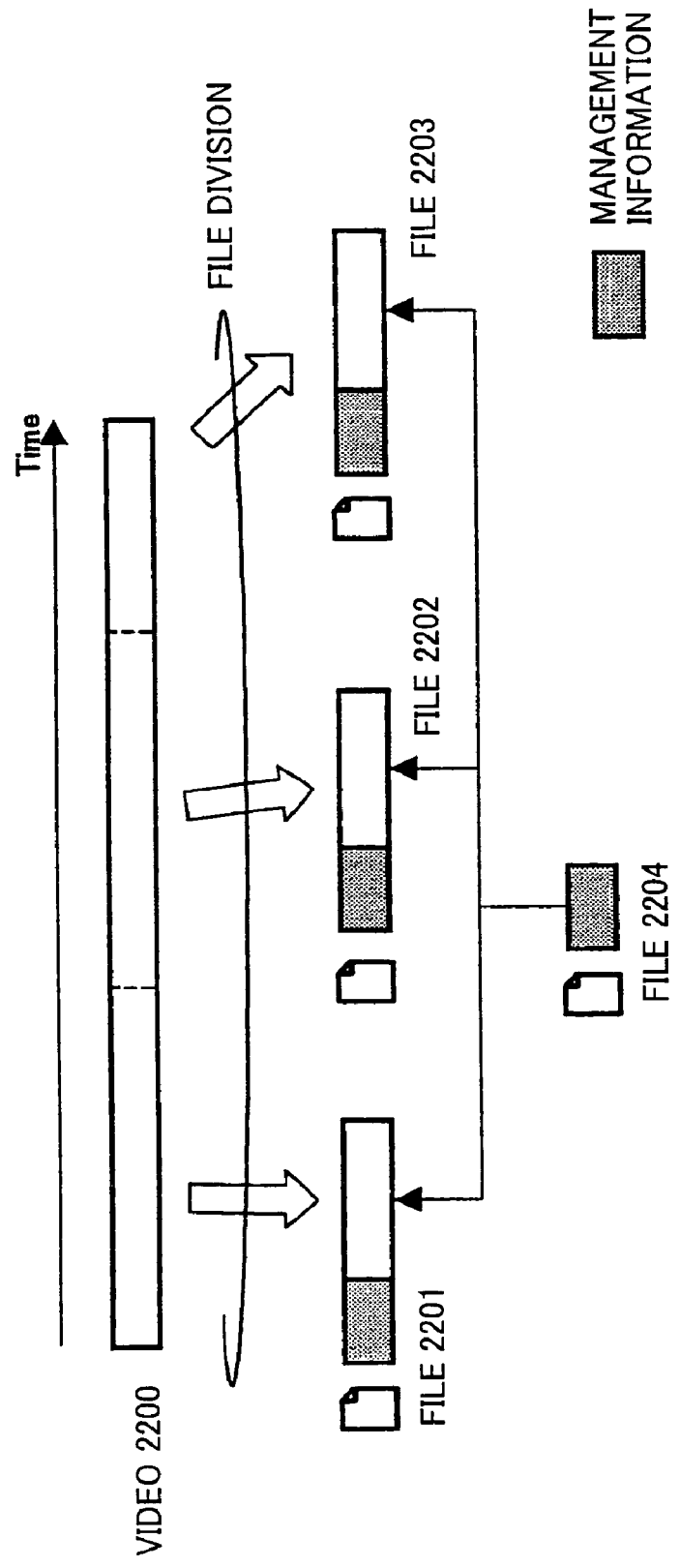
FIG. 34 explains a concept of a reference movie in the conventional art.
Figure 35:
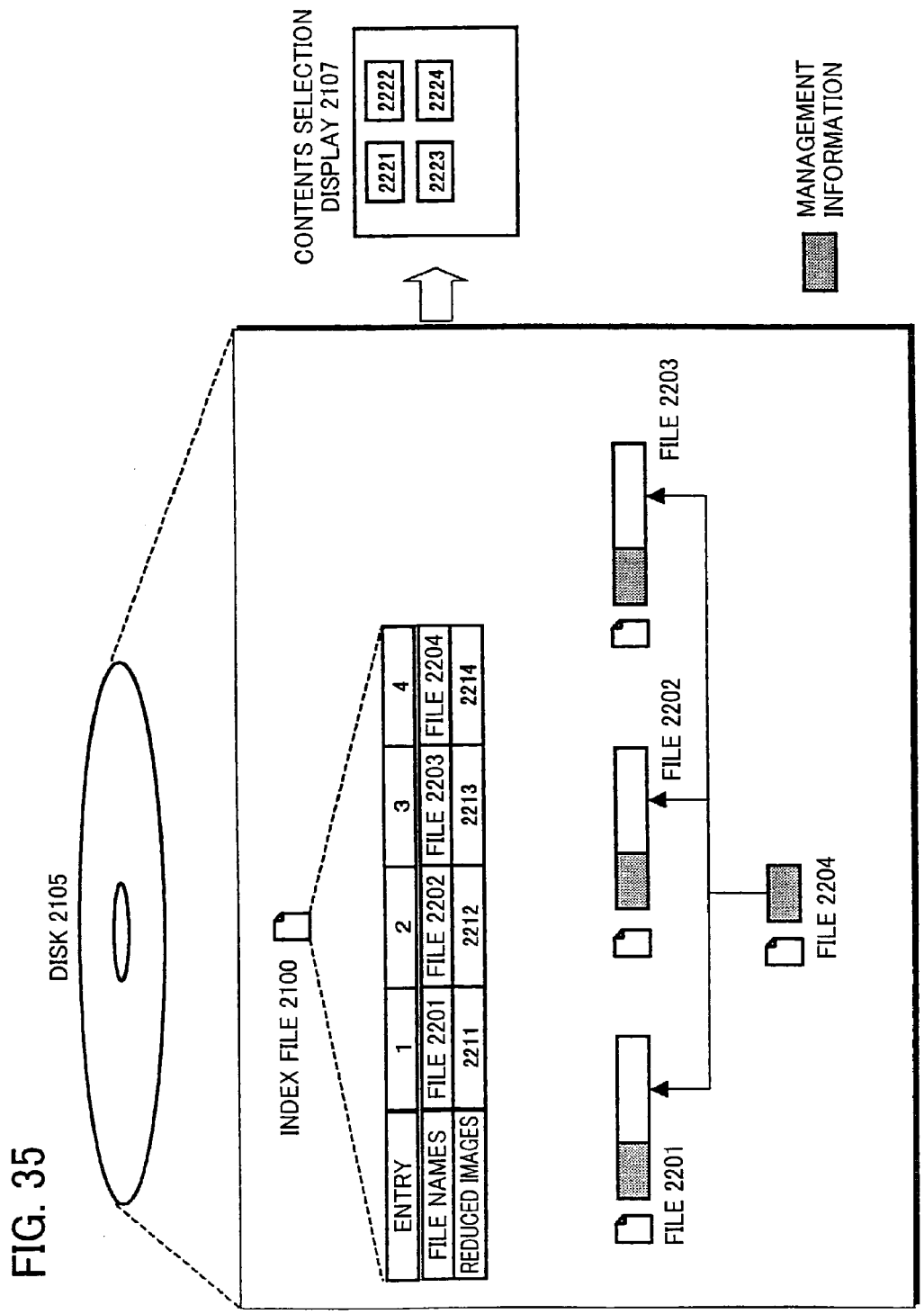
FIG. 35 illustrates an index file for managing the reference movie in the conventional art.

Audio after-recording is carried out with respect to the Av file 1804 in FIG. 29. Supplied audio data is, as shown in FIG. 31, stored in an AV file 1807 which is different from a file to which the previous movie is stored, and this AV file 1807 is caused to be externally referred to by the AV file 1804. On this occasion, the referred-counter of an entry (entry-number 5) corresponding to the AV file 1807 is set to 1 as being referred to by the AV file 1804, and the referring-file-list records 4 which is the entry-number corresponding to the AV file 1804.

Since the AV file 1807 is in subordination to the AV file 1804 and thus not to be treated as an independent content, the AV file 1807 is not shown on the contents selection display. Thus, a value of the Visual status of corresponding AV File is set to 1 (invisible).

Steps for Showing Contents Selection Display

To the user, thumbnail images corresponding to the attribute information entries in which the Structural status of corresponding AV Files of the pe-flags are set to 0 are displayed. In other words, which thumbnail image is displayed is determined in accordance with the Visual status of corresponding AV File flags. For instance, in the example shown in FIG. 30, thumbnail images having the entry-numbers 3, 4, 5, and 6 are displayed. In the example shown in FIG. 31, meanwhile, thumbnail images having the entry-numbers 3 and 4 are displayed and a thumbnail image corresponding to the AV file 1807 which is not to be treated as an independent content is not displayed. In this manner, unnecessary information is not displayed, and hence the user is unlikely to be puzzled. This advantage is achieved by the addition of the Visual status of corresponding AV File in the present embodiment.

Steps for Erasure

In the present embodiment, the following operation guideline can be implemented in addition to those in First and Second Embodiments, when the user instructs the erasure through the contents selection display.

(Operation Guideline 3) All AV files are erasable.

This operation guideline 3 is based on such an idea that the difference between the original and the edited is caused to be unnoticeable for the user as much as possible. Note that this operation guideline 3 is realized by management information which is introduced in Third Embodiment.

The following will discuss the steps for implementing the respective operation guidelines.

Steps for Erasure (Based on Operation Guideline 1)

The steps carried out in this case are identical with those in Second Embodiment. That is, the steps carried out when the user instructs the erasure through the contents selection display are basically identical with those described in First Embodiment with reference to FIGS. 23 and 24. However, in the present embodiment, in the step S803 shown in FIG. 23, whether the AV File corresponding to the designated entry is generated through the nondestructive editing or is original is identified in such a manner that, the AV File is judged as the product of the nondestructive editing when the Type of corresponding AV File of the pe-flags of the designated entry is 1, while the AV File is judged as original when the Type of corresponding AV File of the pe-flags of the designated entry is 0. To this extent, the steps for the erasure in the present embodiment are different from those in First Embodiment.

In this manner, the present embodiment is arranged such that whether or not the AV Index file is original is determined with reference to the Type of corresponding AV File flag in the AV Index file. This flag is generated on the occasion of creating a file by recording, nondestructive editing and the like. For this reason, this makes it possible to surely identify whether or not the file is original. Furthermore, the present embodiment has such an advantage that the process is correctly carried out irrespective of the accuracy of the built-in clock.

As in the foregoing embodiments, even if an automatically-divided movie file exists, the file is erased only when the automatically-divided movie file is referred to only by a control movie file and not by other files. Thus, the erasure is carried out without making the user feel uncomfortable. Furthermore, reference movies (automatically-divided movie and control movie) are managed without making the user feel be puzzled.

Steps for Erasure (Based on Operation Guideline 2)

The steps carried out in this case are identical with those in First Embodiment. That is, in an example shown in FIG. 30, the referred-counters of the entries whose entry-numbers are 3, 5, and 6 are set to 0, indicating that these entries are not referred to by an AV file corresponding to another entry. Thus, when the user designates these entries whose entry-numbers are 3, 5, and 6 as targets of erasure, these entries are erased. Meanwhile, when the user designates an entry whose entry-number is 4 as a target of erasure, the erasure is rejected or a warning is given to the user.

The erasure in reality is carried out in the following manner: First, the referred-counter of the entry corresponding to the AV file to which the file designated to be erased refers is reduced by 1, and the entry number of the entry corresponding to that AV file is deleted from the referring-file-list. If the referred-counter is reduced to 0, that AV file is erased. At the end, the AV file designated to be erased is erased. Note that the entry of the AV Index file corresponding to the erased AV file is also erased as a matter of course.

Steps for Erasure (Based on Operation Guideline 3)

The following will discuss the operation such that all entries which are instructed by the user to erase through the contents selection display are erasable. The steps for the erasure in this case are described with reference to FIG. 32. First, to check whether or not an AV file corresponding to the designated entry is referred to by another AV file, the referred-counter of the designated entry is examined (S1001).

If the referred-counter is 1, a Visual status of corresponding AV File is set to 1 (S1006). This allows the user to recognize that the file is erased, without causing any influence on the playing of other movies. In other words, the file is apparently erased. In this case, the Visual status of corresponding AV File flag is altered to 1 from 0. If the referred-counter is 0, whether or not the AV file corresponding to the designated entry refers to another AV file is checked (S1002).

If not referring to another file, the below-mentioned step S1005 is carried out. If referring to another file, first, the referred-counter of the entry corresponding to the AV file which is the target of the reference is reduced by 1 (S1003).

Next, values of the referred-counter and Visual status of corresponding AV of the target AV file are checked. If the referred-counter is 0 and the Visual status of corresponding AV is 1 (invisible), the file is erased, and the entry concerning the file is deleted from the AV Index file (S1004). Lastly, the AV file corresponding to the designated entry is erased (S1005).

Referring to FIG. 30, the above-mentioned steps are described more specifically. When entries having entry-numbers 5 and 6 are designated as targets of erasure, these entries are erased and a file 1805 or 1806 is further erased. When an entry having an entry-number 3 is designated as a target of erasure, that entry is erased and a file 1803 is also erased. However, files 1801 and 1802 which are the targets of reference are also referred to by a file 1806, thereby not being erased.

When an entry having an entry-number 4 is designated as a target of erasure, a file 1804 corresponding to that entry is not deleted as being referred to by a file 1805. Instead of erasing the file, the Visual status of corresponding AV File is set to 1.

The same holds true for the example in FIG. 31. When an entry having an entry-number 4 is designated as a target of erasure, the referred-counter of this entry is 0 and the referred-counter of an AV file 1807 referred to by the entry is reduced by 1 so as to be 0. Thus, entries having entry-numbers 4 and 5 are erased, and AV files 1804 and 1807 corresponding to these entries are also erased.

In this manner, the present embodiment adopts a Visual status of corresponding AV File indicating whether or not data is presented to the user by the contents selection display. On this account, the user can erase any arbitrary content even if the content refers to a file. In other words, even a file which is referred to by another file can be apparently erased, i.e. caused not to be displayed.

Variants

In First through Third Embodiments of the present invention, AV Index files manage files stored in the same storage medium. However, as a matter of course, AV Index files may manage a file in a different storage medium, e.g. a file in a remote storage medium via a network.

In the embodiments above, the descriptions were given on assumption that a storage medium is the optical disk 106. However, since the present invention is not limited to this arrangement, the storage medium may be other types of random-access storage media such as a hard disk and a magneto-optical disk.

In the embodiments above, the descriptions were given on assumption that the UDF is adopted as a file system and the Quicktime file format is adopted as a file format. However, since the present invention is not limited to this arrangement, other types of file systems and file formats may be adopted.

In the embodiments above, the descriptions were given on assumption that the file management is carried out using an AV Index file based on the Quicktime file format. However, since the present invention is not limited to this arrangement, the file management may be carried out using other types of files and tables.

As described above, in the foregoing embodiments, the digital recording/reproducing device is, as a storage device, arranged in such a manner that the host CPU 101 as a file management section records, to the optical disk 106, information regarding whether or not data is divisional-recorded.

For this reason, files are appropriately displayed, erased and so on in accordance with the information regarding whether or not data is divisional-recorded, so that the file management is carried out without making the user feel be puzzled.

That is to say, with regard to divided data when the divisional recording is carried out and control data referring to the divided data, the divided data is caused not to be displayed.

This divided data is generated by, because there is an upper limit of the file size in the file system, dividing a file exceeding the upper limit. As described above, causing the divided data not to be displayed eliminates the probability of making the user be perplexed.

To erase control data, divided data referred to by the control data is also erased if the divided data is referred to by only the control data.

With this, even if divided data exists, the erasure is carried out without causing the user to notice the existence of such data. Note that the erasure of data is allowed when the data is not referred to by another file.

Furthermore, the digital recording/reproducing device is, as a storage device, arranged in such a manner that the host CPU 101 as a file management section records, to the optical disk 106, information regarding whether or not data is initially-recorded data.

For this reason, files are appropriately displayed, erased and so on in accordance with the information regarding whether or not data is initially-recorded data, so that the file management operations such as display and erasure is properly carried out without making the user feel be puzzled.

That is, when there are divided data as a result of divisional recording and control data referring to the divided data, it is possible to tell whether or not a set of data is control data, by the information regarding whether or not data is initially-recorded data. Since it is unnecessary to check information such as the creation time of the file, the type of the data is surely detected even if a built-in clock of the storage device is not accurate.

Furthermore, the digital recording/reproducing device is, as a storage device, arranged in such a manner that the host CPU 101 as a file management section records, to the optical disk 106, information regarding whether or not the presence of data is displayed to the user.

With this, files are displayed, apparently erased and so on in an appropriate manner in accordance with the information regarding whether or not the presence of data is displayed to the user, so that the file management operations such as display and erasure is properly carried out without making the user feel be puzzled.

That is, images are displayed in accordance with the information regarding whether or not the presence of data is displayed to the user, in addition to the information indicating whether or not data is divided data. This makes it possible to display images without making the user feel be puzzled, and apparently erase data.

Furthermore, to the optical disk 106 the information regarding whether or not data is initially-recorded data is recorded as described above.

Thus, the optical disk 106 is combined with a storage device such as the aforementioned digital recording/reproduction device, and files are appropriately displayed, erased and so on in accordance with the information regarding whether or not data is initially-recorded data, so that the file management operations such as display and erasure are properly carried out without making the user feel be puzzled.

Furthermore, to the optical disk 106 the information regarding whether or not the presence of data is displayed to the user is recorded as described above.

Thus, the optical disk 106 is combined with a storage device such as the aforementioned digital recording/reproduction device, and files are displayed, apparently erased and so on in an appropriate manner in accordance with the information regarding whether or not the presence of data is displayed to the user, so that the file management operations such as display and erasure are properly carried out without making the user feel be puzzled.

The digital recording/reproduction device as a storage device may be realized using a computer. That is to say, the aforementioned digital recording/reproduction device may be realized in such a manner that a program for implementing either the above-mentioned data recording method or the above-mentioned data erasure method is read and ran by a computer.

The above-mentioned data recording method and data erasure method can be illustrated as, for instance, a file management method for managing data using file management information of a file system. When the file includes a divided file and a control file referring to the divided file, the file management information in accordance with the file management method is caused to include a flag indicating whether or not the file is a divided file. Based on (i) this flag, (ii) the number of times a file is referred to by other files, and (iii) the creation time of the file, it is possible to tell whether or not the file is a control file.

Also, the above-mentioned arrangement can be, for instance, illustrated as a data erasure method for erasing, from a storage medium including a table centrally managing sets of data, the sets of data corresponding to the entries in the table, the data erasure method being characterized by comprising the step of determining whether or not the registered entry is original, on the occasion of the erasure.

Also, the above-mentioned arrangement can be, for instance, illustrated as a data erasure method characterized in that the foregoing step of determining whether or not the registered entry is original is carried out based on the information regarding whether or not automatic division is carried out, the information concerning reference to another sets of data, and a creation time.

Also, the above-mentioned arrangement can be, for instance, illustrated as a data recording method for recording a table, which centrally manages sets of data as respective entries, to a storage medium, the data recording method being characterized in that, to the entries corresponding to the sets of data, information for making it possible to determine whether or not data is original is recorded.

Also, the above-mentioned arrangement can be, for instance, illustrated as a data erasure method for erasing, from a storage medium which includes a table for centrally managing sets of data as respective entries and stores information for determining whether or not these entries are original, the sets of data corresponding to the entries in the table, the data erasure method being characterized in that, on the occasion of the erasure, whether or not the data which is the target of the erasure can be erased in accordance with the information regarding whether or not data is original.

Also, the above-mentioned arrangement can be, for instance, illustrated as a data recording method for recording, to a storage medium, a table which centrally manages sets of data as respective entries, the data recording method being characterized in that the entries corresponding to the sets of data record information regarding whether or not the existence of the sets of data is displayed to the user.

Also, the above-mentioned arrangement can be, for instance, illustrated as a data erasure method for erasing, from the storage medium which includes a table centrally managing sets of data as respective entries and records, to the entries, information regarding whether or not the existence of these sets of data is displayed to the user, the sets of data corresponding to the entries in the table, the data erasure method being characterized in that, if a set of data to be erased is referred to by another set of data, the information regarding whether or not the existence of data is displayed to the user is rewritten.

The present invention realizes the following: Based on the information for determining whether or not files on the disk are automatically-divided movie files and the information for determining whether or not the files are original, the erasure is carried out without making the user feel be puzzled, despite the presence of an automatically-divided movie file.

The present invention realizes the following: The information regarding whether or not data is original is stored in the disk, so that the erasure is carried out without making the user feel be puzzled, despite the presence of an automatically-divided movie file.

The present invention realizes the following: With respect to the AV file corresponding to the entry, the information for determining whether or not data is displayed to the user is stored in the disk, so that the user can apparently erase any set of data even if the data refers to a file.

Figure 36:
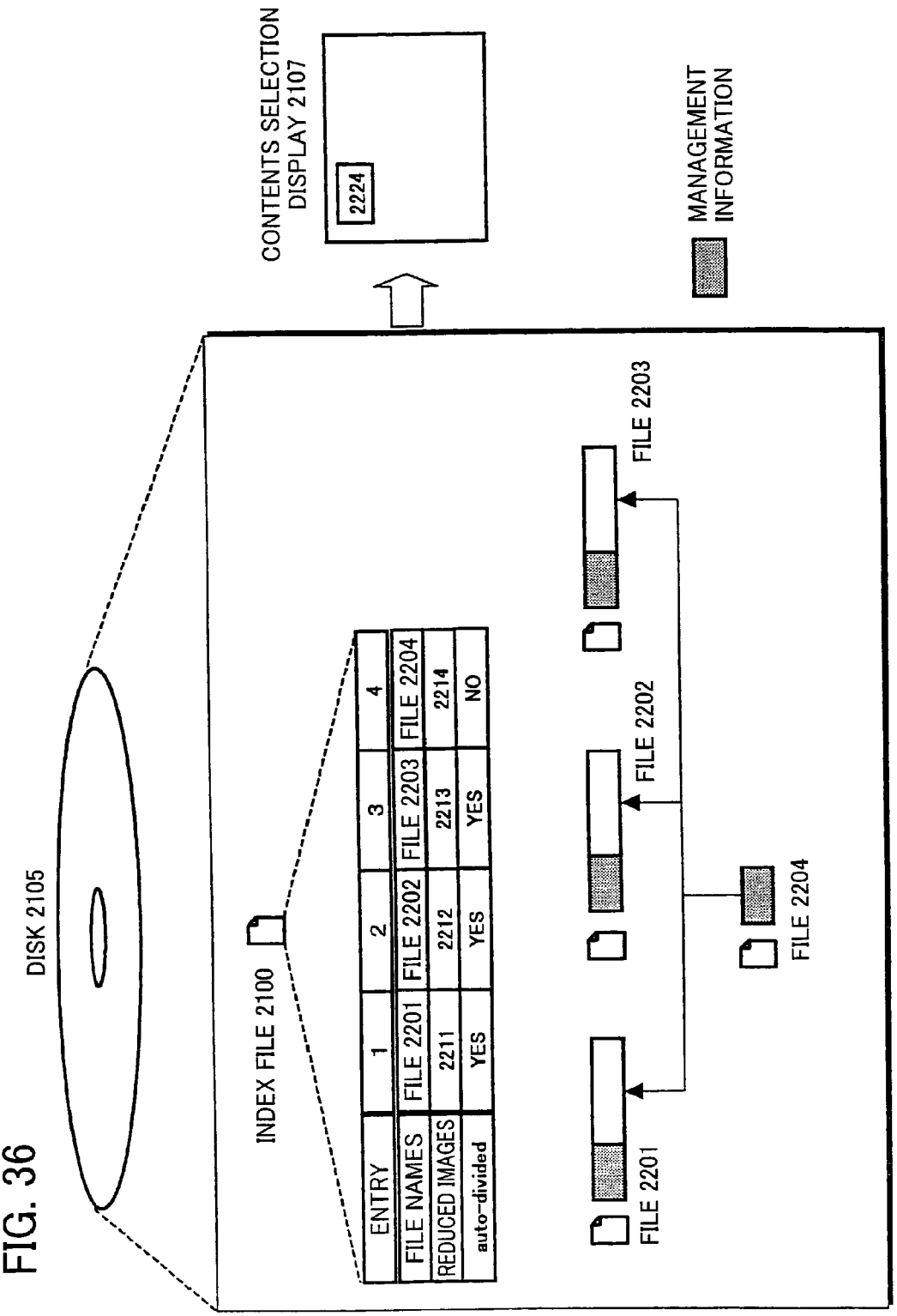
FIG. 36 illustrates an example of an improved index file for managing the reference movie in the conventional art.

Note that, as shown in FIG. 36, the following arrangement may be carried out: To each entry of an index file 2100, an auto-divided flag indicating whether or not the entry is an automatically-divided movie is provided. Files 2201 through 2203 which are automatically-divided movies are set to YES, so that, on the contents selection display, only a miniature image of an entry in which the auto division is NO, i.e. only a miniature image of a file 2204 is shown. However, in this arrangement, it is unclear how management operations, e.g. erasure, are carried out.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

Matters described in claims and technical means described in Embodiments can be appropriately combined with each other, and matters obtained as a result of the combination are not to be regarded as a departure from the spirit and scope of the invention.

INDUSTRIAL APPLICABILITY

According to a data recording method, data erasure method, data display method, storage divide, storage medium, and program, an index file manages sets of information for determining (i) whether or not managed files are displayed to the user, (ii) whether or not the managed files are original, and (iii) whether or not the managed files have been subjected to nondestructive editing, and in accordance with these sets of information, the steps for erasure and the steps for showing a file list are carried out. This makes it possible to manage reference movies by the index file, without making the user feel be puzzled.

The invention claimed is:

1. A data display method for reading out a table from a storage medium and displaying at least sets of data concerning each other according to the table, the table being stored in the storage medium and centrally managing the sets of data as respective entries, the data display method comprising a step of:

displaying on a digital video recording device or a digital video reproducing device at least one of the sets of data, in accordance with a value indicating whether or not presence of the at least one of the sets of data is presented to a user, the value being recorded to one of the entries which corresponds to the at least one of the sets of data, wherein the one entry manages the at least one of the sets of data, the one entry is recorded in the storage medium, and in what way the at least one of the sets of data is displayed is determined in accordance with the recorded value.

2. A data reproducing device for reading out a table from a storage medium and controlling to display at least sets of data concerning each other according to the table, the table being stored in the storage medium and centrally managing the sets of data as respective entries, the data reproducing device comprising:

a display controlling section which controls to display at least one of the sets of data, in accordance with a value indicating whether or not presence of the at least one of the sets of data is presented to a user, the value being recorded to one of the entries which corresponds to the at least one of the sets of data, wherein the one entry manages the at least one of the sets of data, the one entry is recorded in the storage medium, and in what way the at least one of the sets of data is displayed is determined in accordance with the recorded value.

3. The data reproducing device as defined in claim 2, wherein the display controlling section controls to display at least one of the sets of data when the value indicating whether or not presence of the at least one of the sets of data is presented to a user denotes to present the presence of the at least one of the sets of data to a user, and the display controlling section controls not to display at least one of the sets of data when the value indicating whether or not presence of the at least one of the sets of data is presented to a user denotes not to present the presence of the at least one of the sets of data to a user.

4. The data reproducing device as defined in claim 2, wherein:

index data corresponding to the respective sets of data are configured to be selected; and in a case where the value indicating whether or not the presence of the at least one of the sets of data is presented to the user indicates that the presence of the at least one of the sets of data is not presented to the user, the index data corresponding to the at least one of the sets of data is not displayed.

5. A storage device for recording, to the storage medium, the table which centrally manages said sets of data as respective entries, the storage device comprising:

a recording section which records, to each of said entries, said value used for the data reproducing device of claim 2.

6. The storage medium to which a table for centrally managing said sets of data as respective entries is recorded, wherein said value used for the data reproducing device of claim 2 are recorded to each of said entries.

7. A data recording method for recording said sets of data as respective entries in the table provided in the storage medium, the data recording method comprising the step of:

recording for each of said entries the value used for the data reproducing device of claim 2.

8. The data recording method as defined in claim 7, wherein said sets of data include at least sets of divided data and control data referring to said sets of divided data.

9. The data recording method as defined in either claim 7 or claim 8, wherein to each of said entries, information regarding a relationship with data managed by another entry is recorded.

10. The data recording method as defined in claim 7, wherein the table is stored in a file.

11. A program for causing a computer to implement the data recording method defined in either claim 7 or claim 8.

12. A computer-readable storage medium which stores the program defined in claim 11.

* * * * *